United States Patent
Hannuksela et al.

(10) Patent No.: US 12,532,002 B2
(45) Date of Patent: Jan. 20, 2026

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Miska Matias Hannuksela, Tampere (FI); Emre Baris Aksu, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 156 days.

(21) Appl. No.: 18/555,536

(22) PCT Filed: Apr. 12, 2022

(86) PCT No.: PCT/FI2022/050244
§ 371 (c)(1),
(2) Date: Oct. 15, 2023

(87) PCT Pub. No.: WO2022/219244
PCT Pub. Date: Oct. 20, 2022

(65) Prior Publication Data
US 2024/0040131 A1 Feb. 1, 2024

(30) Foreign Application Priority Data
Apr. 16, 2021 (FI) .................................... 20215457

(51) Int. Cl.
*H04N 19/172* (2014.01)
*H04N 19/132* (2014.01)
(Continued)

(52) U.S. Cl.
CPC ......... *H04N 19/172* (2014.11); *H04N 19/132* (2014.11); *H04N 19/136* (2014.11); *H04N 19/70* (2014.11)

(58) Field of Classification Search
CPC ..................................................... H04N 19/172
(Continued)

(56) References Cited

U.S. PATENT DOCUMENTS

| 2008/0208715 A1* | 8/2008 | Hod ....................... G06Q 30/06 705/26.62 |
| 2019/0335251 A1* | 10/2019 | Maze ................. H04N 21/8451 |
| 2021/0006786 A1* | 1/2021 | Gao ........................ H04N 19/70 |

FOREIGN PATENT DOCUMENTS

| GB | 2574445 A | 12/2019 |
| WO | 2021/117802 A1 | 6/2021 |

OTHER PUBLICATIONS

"Information Technology—Coding Of Audio-Visual Objects—Part 15: Advanced Video Coding (AVC) File Format", ISO/IEC 14496-15, First edition, Apr. 15, 2004, 29 pages.
(Continued)

*Primary Examiner* — Yulin Sun
(74) *Attorney, Agent, or Firm* — McCarter & English LLP

(57) ABSTRACT

The embodiments relate to a method comprising indicating a video bitstream format wherein one or more image regions are allowed in a picture of a video bitstream (710); indicating at least a first substitute image region (720); indicating mapping information to locate the first substitute image region in the picture; wherein a first video bitstream comprising the first substitute image region at a location according to the mapping information conforms to the video bitstream format (730). The embodiments also concern a method at a receiver, and technical equipment for implementing the methods.

19 Claims, 8 Drawing Sheets

(51) Int. Cl.
*H04N 19/136* (2014.01)
*H04N 19/70* (2014.01)

(58) Field of Classification Search
USPC .................................................. 375/240.26
See application file for complete search history.

(56) References Cited

OTHER PUBLICATIONS

"Versatile Video Coding", Series H: Audiovisual and Multimedia Systems Infrastructure of audiovisual services—Coding of moving video, Recommendation ITU-T H.266, Aug. 2020, 516 pages.
"Information Technology—Coding Of Audio-Visual Objects—Part 12: ISO Base Media File Format", ISO/IEC 14496-12, Fifth edition, Dec. 15, 2015, 248 pages.
"Information technology—MPEG systems technologies—Part 12: Image File Format", ISO/IEC CD 23008-12, First Edition, Apr. 30, 2013, 55 pages.
"Information Technology—Coding Of Audio-Visual Objects—Part 14: MP4 File Format", ISO/IEC 14496-14, First edition, Nov. 15, 2003, 18 pages.
"3rd Generation Partnership Project; Technical Specification Group Services and System Aspects; Transparent end-to-end packet switched streaming service (PSS); 3GPP file format (3GP) (Release 16)", 3GPP TS 26.244, V16.1.0, Sep. 2020, pp. 1-68.
"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"High Efficiency Video Coding", Series H: Audiovisual And Multimedia Systems, Infrastructure of audiovisual services—Coding of moving video, Recommendation ITU-T H.265, Feb. 2018, 692 pages.
Gellens et al., "The 'Codecs' and 'Profiles' Parameters for "Bucket" Media Types", RFC 6381, Internet Engineering Task Force (IETF), Aug. 2011, pp. 1-19.
"Information technology—JPEG 2000 image coding system: Motion JPEG 2000", ISO/IEC 15444-3, Second edition, May 1, 2007, 12 pages.
"3rd Generation Partnership Project; Technical Specification Group Services and System Aspects; Transparent end-to-end Packet-switched Streaming Service (PSS); Protocols and codecs (Release 16)", 3GPP TS 26.234, V16.2.0, Dec. 2020, pp. 1-173.
"Information technology—Dynamic adaptive streaming over HTTP (DASH)—Part 1: Media presentation description and segment formats", ISO/IEC 23009-1, Second edition, May 15, 2014, 15 pages.
Pantos et al., "HTTP Live Streaming", RFC 8216, Independent Submission, Aug. 2017, pp. 1-60.
"Information technology—Coded representation of immersive media—Part 3: Versatile video coding", ISO/IEC 23090-3, Second edition, Sep. 2022, 15 pages.
Office action received for corresponding Finnish Patent Application No. 20215457, dated Oct. 13, 2021, 10 pages.
Hirabayashi et al., "AHG12 Signaling subpicture without slice for merged picture and other use cases", Joint Video Experts Team (JVET) of ITU-T SG 16 WP 3 and ISO/IEC JTC 1/SC 29/WG 11, 17th Meeting, Jan. 7-17, 2020, pp. 1-5.
"Information technology—Coding of audio-visual objects—Part 15: Carriage of network abstraction layer (NAL) unit structured video in the ISO base media file format—Amendment 2: Carriage of VVC and EVC in Isobmff", ISO/IEC 14496-15, MPEG Document w19715, 2019, 64 pages.
International Search Report and Written Opinion received for corresponding Patent Cooperation Treaty Application No. PCT/FI2022/050244, dated Sep. 19, 2022, 21 pages.
Extended European Search Report received for corresponding European Patent Application No. 22787692.7, dated Nov. 20, 2024, 9 pages.
Katsumata et al., "(8.1) Improvements on subpicture extraction in VVC File Format", Sony Corporation, ISO/IEC JTC 1/SC 29/WG 3 M55922-V2, Jan. 2021, 8 pages.
Kammachi-Sreedhar et al., "(8.1) [14496-15] VVC substitute subpictures for low delay applications", Nokia, ISO/IEC JTC 1/SC 29/WG 3 m56819v2, Apr. 2021, 6 pages.

* cited by examiner

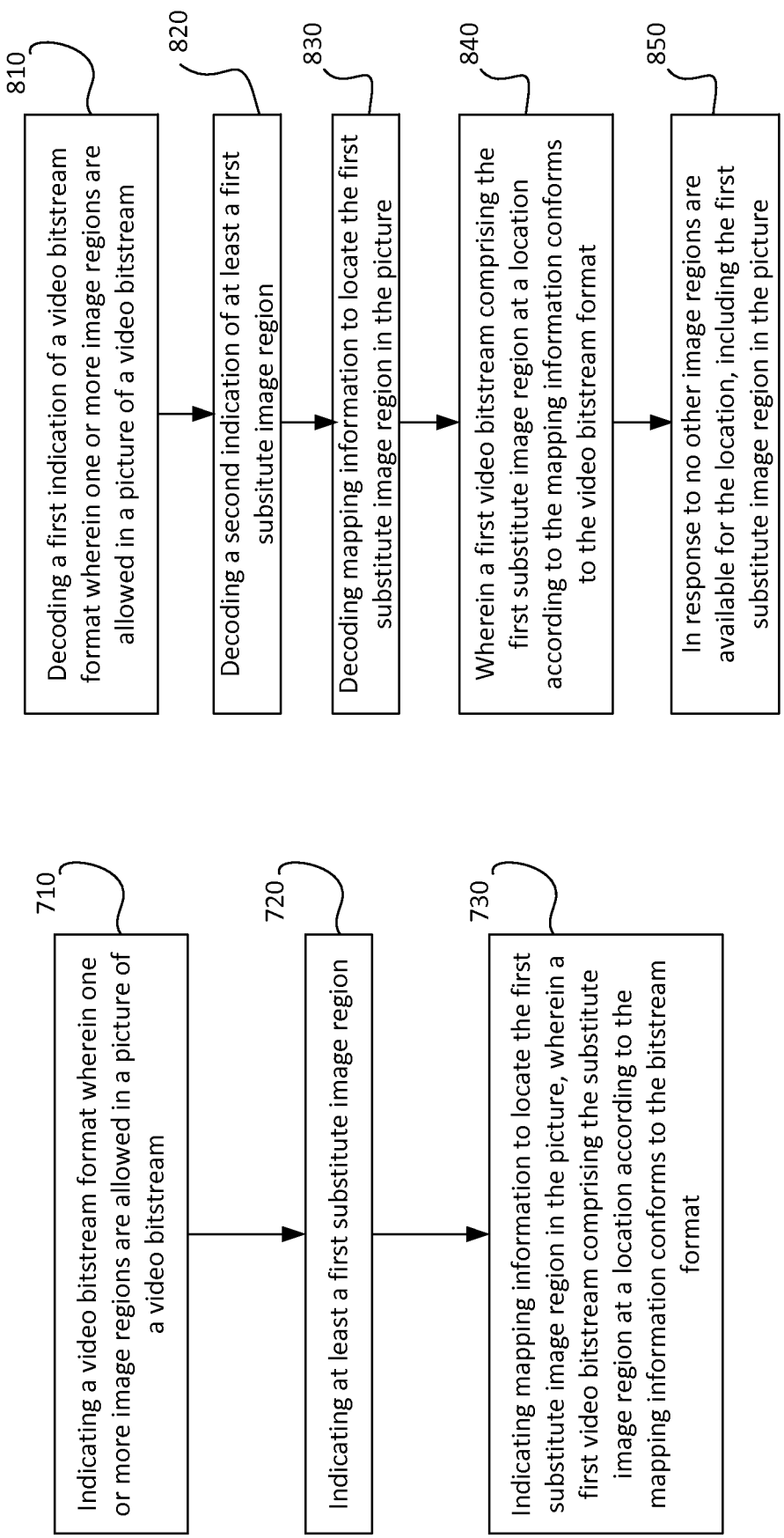

METHOD, AN APPARATUS AND A COMPUTER PROGRAM PRODUCT FOR VIDEO ENCODING AND VIDEO DECODING

RELATED APPLICATION

This application was originally filed as PCT Application No. PCT/FI2022/050244, filed on Apr. 12, 2022, which claims priority from FI application No. 20215457, filed on Apr. 16, 2021, each of which is incorporated herein by reference in its entirety.

TECHNICAL FIELD

The present solution generally relates to video encoding and decoding.

BACKGROUND

A video coding system may comprise an encoder that transforms an input video into a compressed representation suited for storage/transmission, and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method, comprising indicating a video bitstream format wherein one or more image regions are allowed in a picture of a video bitstream; indicating at least a first substitute image region; indicating mapping information to locate the first substitute image region in the picture; wherein a first video bitstream comprising the first substitute image region at a location according to the mapping information conforms to the video bitstream format.

According to a second aspect, there is provided an apparatus comprising at least means for indicating a video bitstream format wherein one or more image regions are allowed in a picture of a video bitstream; means for indicating at least a first substitute image region; means for indicating mapping information to locate the first substitute image region in the picture; wherein a first video bitstream comprising the first substitute image region at a location according to the mapping information conforms to the video bitstream format.

According to a third aspect, there is provided an apparatus comprising at least one processor, memory including computer program code, the memory and the computer program code configured to, with the at least one processor, cause the apparatus to perform at least the following: indicate a video bitstream format wherein one or more image regions are allowed in a picture of a video bitstream; indicate at least a first substitute image region; indicate mapping information to locate the first substitute image region in the picture; wherein a first video bitstream comprising the first substitute image region at a location according to the mapping information conforms to the video bitstream format.

According to a fourth aspect, there is provided a computer program product comprising computer program code configured to, when executed on at least one processor, cause an apparatus or a system to indicate a video bitstream format wherein one or more image regions are allowed in a picture of a video bitstream; indicate at least a first substitute image region; indicate mapping information to locate the first substitute image region in the picture; wherein a first video bitstream comprising the first substitute image region at a location according to the mapping information conforms to the video bitstream format.

According to an embodiment, the indicating at least the first substitute image region implies that the first substitute image region is intended to be included in the picture when no other image regions are available for the location.

According to an embodiment, at least a first substitute image region is present in a sample of a subpicture track and the indication of the at least first substitute image region comprises one or more of the following:

A specific box in a sample entry of the subpicture track;
A dedicated box header flag of a configuration box contained in the sample entry of the subpicture track;
A specific field in the configuration box contained in the sample entry of the subpicture track;
A new part of codecs MIME parameter for the sample entry of the subpicture track;
A new optional MIME parameter;
A new element or attribute in a media description, such as DASH MPD;
A new track group type;
A new bit in the flags field in the header of the 'alte' box; e.g. bit equal to 1 indicating a substitute subpicture or alike;
A new field extending the 'alte' box;
A new track reference type from/to substitute track to/from subpicture track;
A new bit in the flags field of the TrackHeaderBox is used in indicating if the track contains presentable data, e.g., 0 indicating presentable data and 1 indicating non-presentable data;
consequently, value 1 is used for substitute subpicture tracks.

According to an embodiment, the indicating at least the first substitute image region implies that the first substitute image region is not intended for displaying.

According to an embodiment, the mapping information associates the first substitute image region with at least one of the following: a track group of image region tracks; a first image region location in an image region layout; at least a first image region reference that is resolvable to a first sequence of image regions that may be substituted by the first substitute image region.

According to an embodiment, said indicating comprises writing one or more indications into one or more containers, wherein the one or more containers are any combination of following: metadata in a file that encapsulates coded video data for the first video bitstream; a media description for the first video bitstream; a syntax structure in or along the first video bitstream.

According to an embodiment, the computer program product is embodied on a non-transitory computer readable medium.

According to a fifth aspect, there is provided a method, comprising decoding a first indication of a video bitstream format wherein one or more image regions are allowed in a picture of a video bitstream; decoding a second indication of at least a first substitute image region; decoding mapping information to locate the first substitute image region in the picture; wherein a first video bitstream comprising the first substitute image region at a location according to the mapping information conforms to the video bitstream format; and in response to no other image regions are available for the location, including the first substitute image region in the picture.

According to a sixth aspect, there is provided an apparatus comprising at least means for decoding a first indication of a video bitstream format wherein one or more image regions are allowed in a picture of a video bitstream; means for decoding a second indication of at least a first substitute image region; means for decoding mapping information to locate the first substitute image region in the picture; wherein a first video bitstream comprising the first substitute image region at a location according to the mapping information conforms to the video bitstream format; and in response to no other image regions are available for the location, means for including the first substitute image region in the picture.

According to a seventh aspect, there is provided an apparatus comprising at least one processor, memory including computer program code, the memory and the computer program code configured to, with the at least one processor, cause the apparatus to perform at least the following: decode a first indication of a video bitstream format wherein one or more image regions are allowed in a picture of a video bitstream; decode a second indication of at least a first substitute image region; decode mapping information to locate the first substitute image region in the picture; wherein a first video bitstream comprising the first substitute image region at a location according to the mapping information conforms to the video bitstream format; and in response to no other image regions are available for the location, include the first substitute image region in the picture.

According to an eighth aspect, there is provided a computer program product comprising computer program code configured to, when executed on at least one processor, cause an apparatus or a system to: decode a first indication of a video bitstream format wherein one or more image regions are allowed in a picture of a video bitstream; decode a second indication of at least a first substitute image region; decode mapping information to locate the first substitute image region in the picture; wherein a first video bitstream comprising the first substitute image region at a location according to the mapping information conforms to the video bitstream format; and in response to no other image regions are available for the location, include the first substitute image region in the picture.

According to an embodiment, the indicating at least the first substitute image region implies that the first substitute image region is not intended for displaying.

According to an embodiment, at least a first substitute image region is present in a sample of a subpicture track and the indication of the at least first substitute image region comprises one or more of the following:

A specific box in a sample entry of the subpicture track;

A dedicated box header flag of a configuration box contained in the sample entry of the subpicture track;

A specific field in the configuration box contained in the sample entry of the subpicture track;

A new part of codecs MIME parameter for the sample entry of the subpicture track;

A new optional MIME parameter;

A new element or attribute in a media description, such as DASH MPD;

A new track group type;

A new bit in the flags field in the header of the 'alte' box; e.g. bit equal to 1 indicating a substitute subpicture or alike;

A new field extending the 'alte' box;

A new track reference type from/to substitute track to/from subpicture track;

A new bit in the flags field of the TrackHeaderBox is used in indicating if the track contains presentable data, e.g., 0 indicating presentable data and 1 indicating non-presentable data;

consequently, value 1 is used for substitute subpicture tracks.

According to an embodiment, the mapping information associates the first substitute image region with at least one of the following: a track group of image region tracks; a first image region location in an image region layout; at least a first image region reference that is resolvable to a first sequence of image regions that may be substituted by the first substitute image region.

According to an embodiment, said indicating comprises writing one or more indications into one or more containers, wherein the one or more containers are any combination of following: metadata in a file that encapsulates coded video data for the first video bitstream; a media description for the first video bitstream; a syntax structure in or along the first video bitstream.

According to an embodiment, it is determined whether the same substitute image region is included multiple times in the same picture and in such a case, rewriting an identifier value of such substitute image regions with a same identifier value.

DESCRIPTION OF THE DRAWINGS

In the following, various embodiments will be described in more detail with reference to the appended drawings, in which

FIG. 7 is a flowchart illustrating a method according to an embodiment;

FIG. 8 is a flowchart illustrating a method according to another embodiment.

DESCRIPTION OF EXAMPLE EMBODIMENTS

Figure 1:
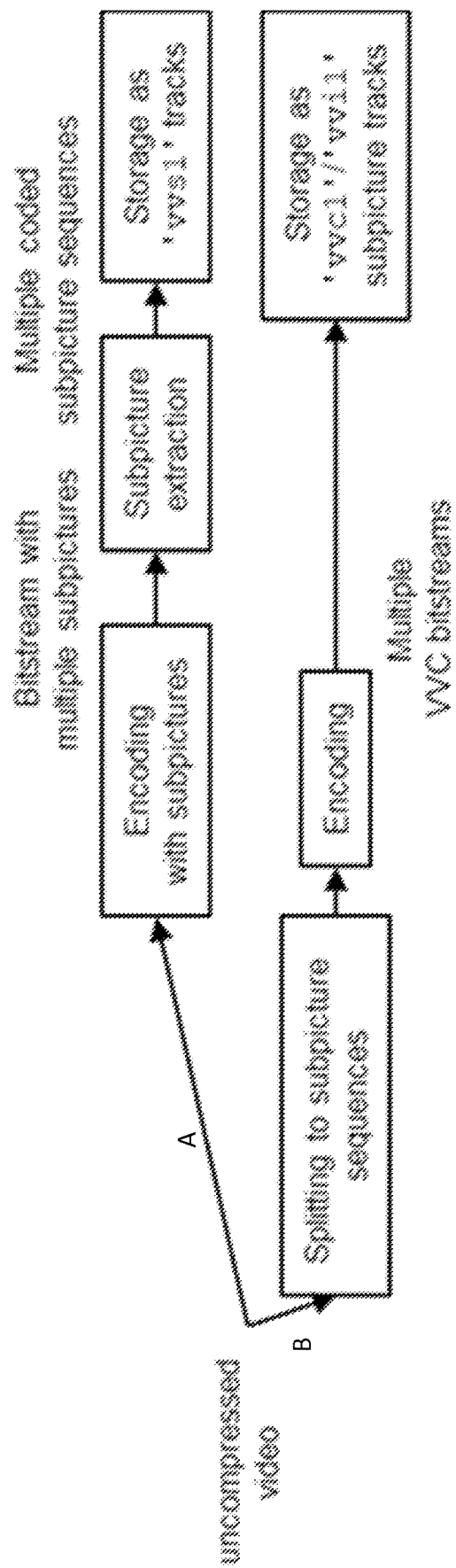
FIG. 1 shows two possibilities for creating VVC subpicture tracks.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

ISO base media file format (ISO/IEC 14496-12, ISOBMFF) contains timed media information for a presentation in a flexible, extensible format that facilitates interchange, management, editing and presentation of the media.

The presentation may occur locally in the system containing the presentation, or may be via a network or other stream delivery mechanism.

Files conforming the ISO base media file format are formed as a series of objects, called "boxes". A presentation may be contained in several files. One file contains the metadata for the whole presentation. Such file may also contain all the media data.

The syntax of many media file formats is based on a hierarchical list of type and length prefixed data chunks or boxes, where the naming depends on the format in question. In a container file according to ISO base media file format (ISOBMFF; ISO/IEC 14496-12), the media data and metadata is arranged in various types of boxes. Many formats are derived from ISOBMFF, including the High Efficiency Image File Format (HEIF, ISO/IEC 23008-12), MPEG-4 file format (ISO/IEC 14496-14, also known as the MP4 format), file format for NAL unit structured video (ISO/IEC 14496-15) and 3GPP file format (3GPP TS 26.244, also known as the 3GP format). These formats use the same box-structured basic structure.

Some concepts, structures, and specifications of ISO base media file format (ISO/IEC 14496-12, which may be abbreviated ISOBMFF) are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data box (e.g. 'mdat') and the MovieBox ('moov') may be used to enclose the metadata for timed media. In some cases, for a file to be operable, both of the 'mdat' and 'moov' boxes may be required to be present. The 'moov' box may include metadata for one or more tracks, and metadata for each track may reside in one corresponding TrackBox ('trak'). Each track is associated with a handler, identified by a four-character code, specifying the track type. A track may be one of the many types, including a media track that refers to samples formatted according to a media compression format (and its encapsulation to the ISO base media file format). Video, audio, and image sequence tracks can be collectively called media tracks, and they may contain an elementary media stream. Other track types comprise hint tracks and timed metadata tracks.

Tracks comprise samples, such as audio or video frames. For video tracks, a media sample may correspond to a coded picture or an access unit. A media track refers to samples (which may also be referred to as media samples) formatted according to a media compression format and its encapsulation to the ISO base media file format. A hint track refers to hint samples, containing cookbook instructions for constructing packets for transmission over an indicated communication protocol. A timed metadata track may refer to samples describing referred media and/or hint samples.

Each sample may be associated with a decoding time and a composition time in the file metadata. A composition time may be regarded as a presentation time for the sample.

The 'trak' box contains a Sample Table box. The Sample Table box comprises e.g. all the time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es). The syntax may be specified as follows:

```
aligned(8) class TrackReferenceBox extends Box('tref') {
    TrackReferenceTypeBox [ ];
}
aligned(8) class TrackReferenceTypeBox (unsigned int(32)
reference_type) extends Box(reference_type) {
    unsigned int(32) track_IDs[ ];
}
``` track_IDs may be specified as an array of integers providing the track identifiers of the referenced tracks or track_group_id values of the referenced track groups. Each value of track_IDs [i], where i is a valid index to the track_IDs[ ] array, is an integer that provides a reference from the containing track to the track with track_ID equal to track_IDs [i] or to the track group with both track_group_id equal to track_IDs [i] and a particular bit (e.g. the least significant bit) of the flags field of TrackGroupTypeBox equal to 1. When a track_group_id value is referenced, the track reference applies to each track of the referenced track group individually unless stated otherwise in the semantics of particular track reference types. The value 0 might not be allowed to be present.

The track grouping mechanism enables indication of groups of tracks, where each group shares a particular characteristic or the tracks within a group have a particular relationship. TrackGroupBox may be contained in a TrackBox. TrackGroupBox contains zero or more boxes derived from TrackGroupTypeBox. The particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

The ISO Base Media File Format standard also comprises the compact sample to group box that provides a more compact way to represent the mapping from sample to group, especially in the cases where there are repeating patterns, and when there are few sample groups of a particular type. The compact sample to group box design uses a vector of concatenated patterns each of which is used once by a mapping array, which associates runs of samples with repeats of that pattern.

In the description and embodiments, a compact sample-to-group box or alike may be used equivalently when a sample-to-group box or SampleToGroupBox is referred.

A sub-sample may be defined as a contiguous range of bytes of a sample. Information on sub-samples may be given in SubSampleInformationBox(es) that may be contained in the SampleTableBox and/or TrackFragmentBox(es).

Specific definition of a sub-sample may be for a given coding system and/or for a given encapsulation format of a coding system (e.g. particular sample entry type) and/or may be further specified using the flags field of the containing SubSampleInformationBox. For example, values of the flags field for HEVC can indicate a sub-sample addressed by the SubSampleInformationBox is a NAL unit, a decoding unit, a tile, a coding tree unit row, a slice, or a coded picture. When more than one SubSampleInformationBox is present in the same container box, the value of flags may be required to differ in each of these SubSampleInformationBoxes.

The syntax of SubSampleInformationBox may be specified as follows:

```
aligned(8) class SubSampleInformationBox
    extends FullBox('subs', version, flags) {
    unsigned int(32) entry_count;
    int i, j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if (version == 1)
```

-continued

```
    {
        unsigned int(32) subsample_size;
    }
    else
    {
        unsigned int(16) subsample_size;
    }
    unsigned int(8) subsample_priority;
    unsigned int(8) discardable;
    unsigned int(32) codec_specific_parameters;
            }
        }
    }
}
```

The semantics of syntax elements of SubSampleInformationBox may be specified as follows: version is an integer that specifies the version of this box. entry_count is an integer that gives the number of entries in the following table. sample_delta is an integer that indicates the sample having sub-sample structure. It is coded as the difference, in decoding order, between the desired sample number, and the sample number indicated in the previous entry. If the current entry is the first entry in the track, the value indicates the sample number of the first sample having sub-sample information, that is, the value is the difference between the sample number and zero (0). If the current entry is the first entry in a track fragment with preceding non-empty track fragments, the value indicates the difference between the sample number of the first sample having sub-sample information and the sample number of the last sample in the previous track fragment. If the current entry is the first entry in a track fragment without any preceding track fragments, the value indicates the sample number of the first sample having sub-sample information, that is, the value is the difference between the sample number and zero (0). This implies that the sample_delta for the first entry describing the first sample in the track or in the track fragment is always 1. subsample_count is an integer that specifies the number of sub-sample for the current sample. If there is no sub-sample structure, then this field takes the value 0. subsample_size is an integer that specifies the size, in bytes, of the current sub-sample. subsample_priority is an integer specifying the degradation priority for each sub-sample. Higher values of subsample_priority, indicate sub-samples which are important to, and have a greater impact on, the decoded quality. discardable equal to 0 means that the sub-sample is required to decode the current sample, while equal to 1 means the sub-sample is not required to decode the current sample but may be used for enhancements, e.g., the sub-sample consists of supplemental enhancement information (SEI) messages. codec_specific_parameters is defined by the codec and/or its encapsulation format (e.g. sample entry type) in use. If no such definition is available, this field is set to 0.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, which may also be included in each track, may define an indexed list of uniform resource locators (URLs), uniform resource names (URNs), and/or self-references to the file containing the metadata. A sample entry may point to one index of the Data Reference box (which, in the syntax, may be referred to as DataReferenceBox), thereby indicating the file containing the samples of the respective chunk or track fragment.

Files conforming to the ISOBMFF may contain any non-timed objects, referred to as items, meta items, or metadata items, in a meta box (four-character code: 'meta'), also referred to as MetaBox or metabox. While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level.

The meta box may be required to contain a 'hdlr' box indicating the structure or format of the 'meta' box contents.

The meta box may list and characterize any number of items that can be referred and each one of them can be associated with a file name and are uniquely identified with the file by item identifier (item_id) which is an integer value. The metadata items may be for example stored in the ItemDataBox ('idat' box) of the meta box or in an 'mdat' box or reside in a separate file. If the metadata is located external to the file then its location may be declared by the DataInformationBox (four-character code: 'dinf').

An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents.

The ItemPropertiesBox enables the association of any item with an ordered set of item properties. Item properties may be regarded as small data records.

The ItemPropertiesBox consists of two parts: ItemPropertyContainerBox that contains an implicitly indexed list of item properties, and one or more ItemPropertyAssociationBox(es) that associate items with item properties.

Item references may be indicated in the ItemReferenceBox ('iref'). The ItemReferenceBox allows the linking of one item to others via typed references. All the references for one item of a specific type are collected into a SingleItemTypeReferenceBox, whose type (in the box header) is the reference type, and which has a from_item_ID field indicating which item is linked. The items linked to are then represented by an array of to_item_IDs.

All these single item type reference boxes are then collected into the ItemReferenceBox.

DataReferenceBox ('dref' box) contains a list of boxes that declare the potential location(s) of the media data referred to by the file. DataReferenceBox is contained by DataInformationBox, which in turn is contained by MediaInformationBox or MetaBox. When contained in the MediaInformationBox, each sample entry of the track contains a data reference index referring to a list entry of the list of box(es) in the DataReferenceBox. When contained in the MetaBox, the ItemLocationBox gives, for each item, the data reference index referring to a list entry of the list of box(es) in the DataReferenceBox. The box(es) in the DataReferenceBox are extended from FullBox, i.e. contain the version and the flags field in the box header. As an example, DataReferenceBox may comprise DataEntryUrlBox and DataEntryUrnBox, which provide a uniform resource locator (URL) and a uniform resource name (URN) data reference, respectively. When the least significant bit of the flags field of either DataEntryUrlBox or DataEntryUrnBox is equal 1, the respective data reference refers to the containing file itself and no URL or URN string is provided within the DataEntryUrlBox or the DataEntryUrnBox.

In ISOBMFF, entity grouping is similar to track grouping but enables grouping of both tracks and items in the same group. Each entity group is specified by an EntityToGroupBox, and all the entity groups of a particular level (file, movie, or track) are contained in a GroupsListBox of the MetaBox of that level. The box type of the EntityToGroupBox indicates the type of the grouping. An EntityToGroupBox contains a group_id and a list of entity_id values. group_id is a non-negative integer assigned to the particular grouping that is not be equal to any group_id value of any other EntityToGroupBox, any item_ID value of the hierarchy level (file, movie. or track) that contains the GroupsListBox, or any track_ID value (when the GroupsListBox is contained in the file level). An entity is either a track or an item. entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

The High Efficiency Image File Format (HEIF) is a standard developed by the Moving Picture Experts Group (MPEG) for storage of images and image sequences (such as video). HEIF includes a rich set of features building on top of the widely used ISO Base Media File Format (ISOBMFF), making HEIF feature-wise superior compared to other image file formats. In the present disclosure, terms "HEIF", "ISOBMFF" and "file format" can be used interchangeably.

The ISOBMFF structures and features are used to a large extent in the design of HEIF. The basic design for HEIF comprises that still images are stored as items and image sequences are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

The ItemPropertiesBox enables the association of any item with an ordered set of item properties. Item properties are small data records. The ItemPropertiesBox consists of two parts: ItemPropertyContainerBox that contains an implicitly indexed list of item properties, and one or more ItemPropertyAssociationBox(es) that associate items with item properties. Item property is formatted as a box.

A descriptive item property may be defined as an item property that describes rather than transforms the associated item. A transformative item property may be defined as an item property that transforms the reconstructed representation of the image item content.

A container file is used for storing visual data. The container file may comprise a FileTypeBox "ftyp" for describing the type of the file. The container file may also comprise MetaBox "meta" comprising information about metadata, single images and derived images. The container file may also comprise a MovieBox "moov" comprising image sequences having a plurality of TrackBoxes "trak". The container file may further comprise a plurality of MediaDataBoxes "mdat" for storing payload image data.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10 also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team—Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

The Versatile Video Coding standard (VVC, H.266 or H.266/VVC) was developed by the Joint Video Experts Team (JVET), which is a collaboration between the ISO/IEC MPEG and ITU-T VCEG.

Some key definitions, bitstream and coding structures, and concepts of H.264/AVC and HEVC and VVC and some of their extensions are described in the following sections as an example of a video encoder, decoder, encoding method, decoding method, and a bitstream structure, wherein the embodiments may be implemented. The aspects of various embodiments are not limited to H.264/AVC or HEVC or VVC or their extensions, but rather the description is given for one possible basis on top of which the present embodiments may be partly or fully realized.

Video codec may comprise an encoder that transforms the input video into a compressed representation suited for storage/transmission and a decoder that can uncompress the compressed video representation back into a viewable form. The compressed representation may be referred to as a bitstream or a video bitstream. A video encoder and/or a video decoder may also be separate from each other, i.e. need not form a codec. The encoder may discard some information in the original video sequence in order to represent the video in a more compact form (that is, at lower bitrate).

Hybrid video codecs, for example ITU-T H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e. the difference between the predicted block of pixels and the original block of pixels, is coded. This may be done by transforming the difference in pixel values using a specified transform (e.g. Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction or current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction may be exploited in intra coding, where no inter prediction is applied.

One outcome of the coding procedure is a set of coding parameters, such as motion vectors (MV) and quantized transform coefficients. Many parameters can be entropy-coded more efficiently if they are predicted first from spatially or temporally neighbouring parameters. For example, a motion vector may be predicted from spatially adjacent motion vectors and only the difference relative to the motion vector predictor may be coded. Prediction of coding parameters and intra prediction may be collectively referred to as in-picture prediction.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Video coding standards may specify the bitstream syntax and semantics as well as the decoding process for error-free bitstreams, whereas the encoding process might not be specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process for erroneous bitstreams might not have been specified.

A syntax element may be defined as an element of data represented in the bitstream. A syntax structure may be defined as zero or more syntax elements present together in the bitstream in a specified order.

An elementary unit for the input to an encoder and the output of a decoder, respectively, may be a picture. A picture given as an input to an encoder may also be referred to as a source picture, and a picture decoded by a decoded may be referred to as a decoded picture or a reconstructed picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus colour samplings (for example, YZX, also known as XYZ).

In the following, these arrays may be referred to as luma (or L or Y) and chroma, where the two chroma arrays may be referred to as Cb and Cr; regardless of the actual colour representation method in use. The actual colour representation method in use can be indicated e.g. in a coded bitstream e.g. using the Video Usability Information (VUI) syntax of HEVC or alike. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:
In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate colour planes are in use, each of the two chroma arrays has the same height and width as the luma array.

Coding formats or standards may allow to code sample arrays as separate colour planes into the bitstream and respectively decode separately coded colour planes from the bitstream. When separate colour planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be predefined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

Partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate colour planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate colour planes and syntax structures used to code the samples.

In some video codecs, such as High Efficiency Video Coding (HEVC) codec, video pictures may be divided into coding units (CU) covering the area of the picture. A CU consists of one or more prediction units (PU) defining the prediction process for the samples within the CU and one or more transform units (TU) defining the prediction error coding process for the samples in the said CU. The CU may consist of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It may be signaled at CU level whether prediction error coding is applied or not for each CU. In the case there is no prediction error residual associated with the CU, it can be considered there are no TUs for the said CU. The division of the image into CUs, and division of CUs into PUs and TUs may be signaled in the bitstream allowing the decoder to reproduce the intended structure of these units.

In the H.266/VVC, the following partitioning applies. Pictures are partitioned into CTUs similarly to HEVC, although the maximum CTU size has been increased to 128×128. A coding tree unit (CTU) is first partitioned by a quaternary tree (a.k.a. quadtree) structure. Then the quaternary tree leaf nodes can be further partitioned by a multi-type tree structure. There are four splitting types in multi-type tree structure, vertical binary splitting, horizontal binary splitting, vertical ternary splitting, and horizontal ternary splitting. The multi-type tree leaf nodes are called coding units (CUs). CU, PU and TU have the same block size, unless the CU is too large for the maximum transform length. A segmentation structure for a CTU is a quadtree with nested multi-type tree using binary and ternary splits, i.e. no separate CU, PU and TU concepts are in use except when needed for CUs that have a size too large for the maximum transform length. A CU can have either a square or rectangular shape.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence. The filtering may for example include one more of the following: deblocking, sample adaptive offset (SAO), and/or adaptive loop filtering (ALF).

Instead, or in addition to approaches utilizing sample value prediction and transform coding for indicating the coded sample values, a colour palette-based coding can be used. Palette based coding refers to a family of approaches for which a palette, i.e. a set of colours and associated indexes, is defined and the value for each sample within a coding unit is expressed by indicating its index in the palette. Palette based coding can achieve good coding efficiency in coding units with a relatively small number of colours (such as image areas which are representing computer screen content, like text or simple graphics). In order to improve the coding efficiency of palette coding different kinds of palette index prediction approaches can be utilized, or the palette indexes can be run-length coded to be able to represent larger homogenous image areas efficiently. Also, in the case the CU contains sample values that are not recurring within the CU, escape coding can be utilized. Escape coded samples are transmitted without referring to any of the palette indexes. Instead their values are indicated individually for each escape coded sample.

The motion information may be indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/ correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R \tag{Eq. 1}$$

Where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

In video coding standards, a compliant bit stream is configured to be decoded by a hypothetical reference decoder that may be conceptually connected to the output of an encoder and consists of at least a pre-decoder buffer, a decoder and an output/display unit. This virtual decoder may be known as the hypothetical reference decoder (HRD) or the video buffering verifier (VBV). A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/ playback. One of the motivations for the HRD is to avoid so-called evil bitstreams, which would consume such a large quantity of resources that practical decoder implementations would not be able to handle.

HRD models may include instantaneous decoding, while the input bitrate to the coded picture buffer (CPB) of HRD may be regarded as a constraint for the encoder and the bitstream on decoding rate of coded data and a requirement for decoders for the processing rate. An encoder may include a CPB as specified in the HRD for verifying and controlling that buffering constraints are obeyed in the encoding. A decoder implementation may also have a CPB that may but does not necessarily operate similarly or identically to the CPB specified for HRD.

A Decoded Picture Buffer (DPB) may be used in the encoder and/or in the decoder. There may be two reasons to buffer decoded pictures, for references in inter prediction and for reordering decoded pictures into output order. Some coding formats, such as HEVC, provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output. An HRD may also include a DPB. DPBs of an HRD and a decoder implementation may but do not need to operate identically.

Output order may be defined as the order in which the decoded pictures are output from the decoded picture buffer (for the decoded pictures that are to be output from the decoded picture buffer).

A decoder and/or an HRD may comprise a picture output process. The output process may be considered to be a process in which the decoder provides decoded and cropped pictures as the output of the decoding process. The output process may be a part of video coding standards, e.g. as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g. in the sequence parameter set that is referred to by the corresponding coded picture.

One or more syntax structures for (decoded) reference picture marking may exist in a video coding system. An encoder generates an instance of a syntax structure e.g. in each coded picture, and a decoder decodes an instance of the syntax structure e.g. from each coded picture. For example, the decoding of the syntax structure may cause pictures to be adaptively marked as "used for reference" or "unused for reference".

A reference picture set (RPS) syntax structure of HEVC is an example of a syntax structure for reference picture marking. A reference picture set valid or active for a picture includes all the reference pictures that may be used as reference for the picture and all the reference pictures that are kept marked as "used for reference" for any subsequent pictures in decoding order. The reference pictures that are kept marked as "used for reference" for any subsequent pictures in decoding order but that are not used as reference picture for the current picture or image segment may be considered inactive. For example, they might not be included in the initial reference picture list(s).

In some coding formats and codecs, a distinction is made between so-called short-term and long-term reference pictures. This distinction may affect some decoding processes such as motion vector scaling. Syntax structure(s) for marking reference pictures may be indicative of marking a picture as "used for long-term reference" or "used for short-term reference".

Scalable video coding refers to coding structure where one bitstream can contain multiple representations of the content at different bitrates, resolutions or frame rates. In these cases, the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may include a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer can be predicted from lower layers. Similarly, the pixel data of the lower layers can be used to create prediction for the enhancement layer.

A bitstream may be defined as a sequence of bits, which may in some coding formats or standards be in the form of a Network Abstraction Layer (NAL) unit stream or a byte stream, that forms the representation of coded pictures and associated data forming one or more coded video sequences. For transport over packet-oriented networks or storage into structured files, NAL units may be encapsulated into packets or similar structures.

NAL units consist of a header and payload. In HEVC, a two-byte NAL unit header is used for all specified NAL unit types, while in other codecs NAL unit header may be similar to that in HEVC.

In HEVC, the NAL unit header contains one reserved bit, a six-bit NAL unit type indication, a three-bit temporal_id_plus1 indication for temporal level or sub-layer (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream. Such temporal scalable layer may comprise VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units may be coded slice NAL units. In HEVC, VCL NAL units contain syntax elements representing one or more CU. In HEVC, the NAL unit type within a certain range indicates a VCL NAL unit, and the VCL NAL unit type indicates a picture type.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit.

Parameter sets may be needed for the reconstruction of decoded pictures, whereas many of the other non-VCL NAL units are not necessary for the reconstruction of decoded sample values.

An SEI NAL unit may comprise one or more SEI messages. SEI messages can contain various types of data, which may e.g. indicate the timing of the video pictures or describe various properties of the coded video. Some SEI messages are able to indicate how the video is recommended to be post-processed or displayed.

A Random Access Point (RAP) picture, which may also be referred to as an intra random access point (IRAP) picture, when contained in an independent layer, may comprise only intra-coded image segments. Furthermore, a RAP picture may constrain subsequent pictures (within the same layer) in output order to be such that they can be correctly decoded without performing the decoding process of any pictures that precede the RAP picture in decoding order. There may be pictures in a bitstream that contain only intra-coded slices that are not IRAP pictures.

In some contexts, the term random-access picture may be used interchangeably with the term RAP picture or the term IRAP picture. In some contexts, a RAP picture or an IRAP picture may be defined as one category of random-access pictures, characterized in that they contain only intra-coded image segments, whereas other category or categories of random-access pictures may allow in-picture prediction, such as intra block copy.

Types and abbreviations for VCL NAL unit types may include the following: trailing (TRAIL), Temporal Sub-layer Access (TSA), Step-wise Temporal Sub-layer Access (STSA), Random Access Decodable Leading (RADL), Random Access Skipped Leading (RASL), Instantaneous Decoding Refresh (IDR), Clean Random Access (CRA). When all VCL NAL units of a picture have the same NAL unit type, the types and abbreviations may be used as picture types, trailing picture (a.k.a. TRAIL picture).

Some VCL NAL unit types may be more fine-grained as indicated in the paragraph above. For example, two types of IDR pictures may be specified, IDR without leading pictures, IDR with random access decodable leading pictures (i.e. without RASL pictures).

In VVC, an IRAP picture may be a CRA picture or an IDR picture.

In HEVC and VVC, provided the necessary parameter sets are available when they are activated or referenced, an IRAP picture at an independent layer and all subsequent non-RASL pictures at the independent layer in decoding order can be correctly decoded without performing the decoding process of any pictures that precede the IRAP picture in decoding order.

In HEVC and VVC, a CRA picture may be the first picture in the bitstream in decoding order, or may appear later in the bitstream. CRA pictures allow so-called leading pictures that follow the CRA picture in decoding order but precede it in output order. Some of the leading pictures, so-called RASL pictures, may use pictures decoded before the CRA picture (in decoding order) as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order and follows the associated RAP picture in decoding order. The associated RAP picture is the previous RAP picture in decoding order (if present). In some coding specifications, such as HEVC and VVC, a leading picture is either a RADL picture or a RASL picture.

All RASL pictures are leading pictures of an associated IRAP picture (e.g. CRA picture). When the associated RAP picture is the first coded picture in the coded video sequence or in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture.

Two IDR picture types may be defined and indicated: IDR pictures without leading pictures and IDR pictures that may have associated decodable leading pictures (i.e. RADL pictures).

A trailing picture may be defined as a picture that follows the associated RAP picture in output order (and also in decoding order). Additionally, a trailing picture may be required not to be classified as any other picture type, such as STSA picture.

Images can be split into independently codable and decodable image segments (e.g. slices or tiles or tile groups), which may also or alternatively be referred to as image regions. Such image segments may enable parallel processing, "Slices" in this description may refer to image segments constructed of certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in H.264/AVC and HEVC. Coded image segments may comprise a header and a payload, wherein the header contains parameter values needed for decoding the payload.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL (Network Abstraction Layer) unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In H.266/VVC, pictures are partitioned to tile along a tile grid (similarly to HEVC). CTUs are ordered in the bitstream in raster scan order within a tile.

Some coding formats specify parameter sets that may carry parameter values needed for the decoding or reconstruction of decoded pictures. Parameters that remain unchanged through a coded video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (HPS) has been proposed to contain such parameters that may change on picture basis. In VVC, an Adaptation Parameter Set (APS) may comprise parameters for decoding processes of different types, such as adaptive loop filtering or luma mapping with chroma scaling.

A parameter set may be activated when it is referenced e.g. through its identifier. For example, a header of an image segment, such as a slice header, may contain an identifier of the PPS that is activated for decoding the coded picture containing the image segment. A PPS may contain an identifier of the SPS that is activated, when the PPS is activated. An activation of a parameter set of a particular type may cause the deactivation of the previously active parameter set of the same type.

Instead of or in addition to parameter sets at different hierarchy levels (e.g. sequence and picture), video coding formats may include header syntax structures, such as a sequence header or a picture header. A sequence header may precede any other data of the coded video sequence in the bitstream order. A picture header may precede any coded video data for the picture in the bitstream order.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded picture is a coded representation of a picture.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A coded video sequence (CVS) may be defined as such a sequence of coded pictures in decoding order that is independently decodable and is followed by another coded video sequence or the end of the bitstream.

A Multipurpose Internet Mail Extension (MIME) is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. Especially when the end system has limited resources, or the connection to the end system has limited bandwidth, it may be helpful to know from the content type alone if the content can be rendered.

Internet Engineering Tasking Force (IETF) Request For Comments (RFC) 6381 specifies two parameters, 'codecs' and 'profiles', that are used with various MIME types or type/subtype combinations to allow for unambiguous specification of the codecs employed by the media formats contained within, or the profile(s) of the overall container format.

By labelling, in the codecs MIME parameter, content with the specific codecs indicated to render the contained media, receiving systems can determine if the codecs are supported by the end system, and if not, can take appropriate action (such as rejecting the content, sending notification of the situation, transcoding the content to a supported type, fetching and installing the required codecs, further inspection to determine if it will be sufficient to support a subset of the indicated codecs, etc.).

For file formats derived from the ISOBMFF, the codecs parameter specified in RFC 6381 is derived from the sample entry type(s) of the track(s) of the file described by the MIME type.

Similarly, the profiles parameter specified in RFC 6381 can provide an overall indication, to the receiver, of the specifications with which the content complies. This is an indication of the compatibility of the container format and its contents to some specification. The receiver may be able to work out the extent to which it can handle and render the content by examining to see which of the declared profiles it supports, and what they mean. For file formats derived from the ISOBMFF, the profiles MIME parameter contains a list of four-character codes that are indicated as compatible brands in the FileTypeBox of the file described by the MIME type.

ISO/IEC 14496-15 defines a storage format based on, and compatible with, the ISO Base Media File Format (ISO/IEC 14496-12), which is used by the MP4 file format (ISO/IEC 14496-14) and the Motion JPEG 2000 file format (ISO/IEC 15444-3) among others. ISO/IEC 14496-15 enables video stream(s) formatted as Network Abstraction Layer Units (NAL Units), which contain different types of data, in a file compliant with ISOBMFF.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats"). MPEG DASH and 3GP-DASH are technically close to each other and may therefore be collectively referred to as DASH.

Some concepts, formats, and operations of DASH are described below as an example of a video streaming system, wherein an example embodiment may be implemented. The aspects of certain embodiments of this disclosure are not limited to DASH, but rather the description is given for one possible basis on top of which certain embodiments of the disclosure may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request.

To play the content, the DASH client may obtain the MPD by using HTTP, email, thumb drive, broadcast, or other transport methods, for example. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and/or other content characteristics. Using this information, the DASH client may select the appropriate encoded alternative and start streaming the content by fetching the segments using HTTP GET requests, for example. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. A media content component type may be defined as a single type of media content such as audio, video, or text. A media stream may be defined as an encoded version of a media content component.

In DASH, a hierarchical data model is used to structure a media presentation as follows. A media presentation consists of a sequence of one or more Periods, each Period contains one or more Groups, each Group contains one or more Adaptation Sets, each Adaptation Set contains one or more Representations, and each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, such as by bitrate, resolution, language, codec, or the like, for example. The Segment contains a certain duration of media data, and metadata to decode and present the included media content. A Segment is identified by a URI and can typically be requested by an HTTP GET request. A Segment may be defined as a unit of data associated with an HTTP-URL and optionally a byte range that may be specified by an MPD.

A Segment may further be partitioned into Subsegments each of which may contain complete access units. Subsegments may be indexed by Segment index, which contains information to map presentation time range and byte range for each Subsegment and may be used to make a HTTP GET request for a specific Subsegment using byte range HTTP request. If relatively long Segment duration is used, then Subsegments may be used to keep the size of HTTP responses reasonable and flexible for bitrate adaptation. In ISOBMFF based segment formats, a subsegment may be defined as a self-contained set of one or more consecutive movie fragments, where the self-contained set contains one or more Movie Fragment boxes with the corresponding Media Data box(es), and a Media Data Box containing data referenced by a Movie Fragment Box must follow that Movie Fragment box and precede the next Movie Fragment box containing information about the same track.

An elementary stream may be defined as sequence of one or more bitstreams.

A VVC subpicture is a rectangular region of one or more slices within a picture. An encoder may treat the subpicture boundaries like picture boundaries and may turn off loop filtering across the subpicture boundaries. Thus, it is possible to encode subpictures so that selected subpictures can be extracted from VVC bitstream(s) or merged to a destination VVC bitstream. Furthermore, such VVC bitstream extraction or merging operations can be performed without modifications of the video coding layer (VCL) NAL units. The subpicture identifiers (IDs) for the subpictures that are present in the bitstream may be indicated in the sequence parameter set(s) or picture parameter set(s).

ISO/IEC 14496-15 comprises the following types of tracks for carriage of VVC video: VVC track, VVC non-VCL track, VVC subpicture track.

A VVC track represents a VVC elementary stream by including NAL units in its samples and/or sample entries, and possibly by associating other VVC tracks containing other layers and/or sublayers of the VVC elementary stream through 'vvcb' entity group and the 'vopi' sample group or through the 'opeg' entity group, and possibly by referencing VVC subpicture tracks.

When a VVC track references VVC subpicture tracks, it is also referred to as a VVC base track. A VVC base track shall not contain VCL NAL units and shall not be referred to by a VVC track through a 'vvcN' track reference.

A VVC non-VCL track is a track that contains only non-VCL NAL units and is referred to by a VVC track through a 'vvcN' track reference.

A VVC subpicture track contains either of the following: a sequence of one or more VVC subpictures forming a rectangular region, or a sequence of one or more complete slices forming a rectangular region. A sample of a VVC subpicture track contains either of the following: one or more complete subpictures that form a rectangular region, or one or more complete slices that form a rectangular region.

VVC subpicture tracks enable the storage of VVC subpictures as separate tracks so that any combination of subpictures can be streamed or decoded. VVC subpicture tracks enable representing rectangular regions of the same video content at different bitrates or resolutions. Consequently, bitrate or resolution emphasis on regions can be adapted dynamically by selecting the VVC subpicture tracks that are streamed or decoded.

When a VVC subpicture track contains a conforming VVC bitstream, which can be consumed without other VVC subpicture tracks, a regular VVC sample entry is used ('vvc1' or 'vvi1') for the VVC subpicture track. When a VVC subpicture track does not contain a conforming VVC bitstream, a 'vvs1' sample entry is used for the VVC subpicture track.

VVC subpicture tracks may be created in two ways, as presented in FIG. 1. In a first example (A), the video content is encoded with multiple subpictures into a VVC bitstream; the coded subpicture sequences are extracted from the VVC bitstream; and each extracted coded subpicture sequence is stored as a 'vvs1' VVC subpicture track. In a second example (B), the uncompressed video is split before encoding into multiple uncompressed subpicture sequences; each uncompressed sequence is encoded as a VVC bitstream; and each VVC bitstream is stored as a 'vvc1'/'vvi1' track.

The above-described ways of creating the VVC subpicture tracks can be mixed. For example, after extracting coded subpictures, they can be stored as 'vvc1'/'vvi1' tracks, which would require creating some high-level syntax structures, such as parameter sets.

A video stream is represented by one or more video tracks in a file. Track group box enables indication of groups of tracks, where each group has certain characteristic or a particular relationship. The contained boxes include an identifier to be used for concluding the tracks belonging to the same track group. track_group_type indicates grouping type.

Members of the track group with track_group_type equal to 'alte' are alternatives to be used as a source for 'subp', 'scal' or 'sabt' track reference. The value of (flags & 1) shall be equal to 1 in a TrackGroupTypeBox of type 'alte' to indicate the uniqueness of track_group_id as specified in ISO/IEC 14496-12.

A 'subp', 'scal' or 'sabt' track reference may refer to a track_group_id value of an 'alte' track group. As implied by the general semantics of a track reference to a track_group_id specified in ISO/IEC 14496-12, any single track of an 'alte' track group is a valid source for VVC subpicture track selection or for extraction or for bitstream reconstruction from tile tracks.

One or more VVC base tracks are created for a set of VVC subpicture tracks or 'alte' tracks groups of VVC subpicture tracks. A VVC base track references to VVC subpicture tracks or 'alte' tracks groups of VVC subpicture tracks through a 'subp' track reference. In addition, a VVC base track contains a subpicture order ('spor') sample group, which specifies, either implicitly or explicitly, an order of 'subp' track references. A VVC base track represents a VVC bitstream that is formed by merging the referenced VVC subpicture tracks in the order specified by the subpicture order sample group. When an 'alte' track group is referenced, readers may select any VVC subpicture track from the 'alte' track group for merging. When a track reference index of the same 'alte' track group is included multiple times in a 'spor' sample group description entry, a reader is expected to resolve it to different VVC subpicture tracks. A reader shall reconstruct a VVC bitstream by following the bitstream reconstruction process for a VVC base track.

Subpicture entity groups may be created for representing combinations of VVC subpicture tracks that could be merged as VVC bitstreams. A reader needs to create some high-level structures of the bitstream, such as parameter sets, when merging VVC subpicture tracks as suggested by subpicture entity groups.

Figure 2:
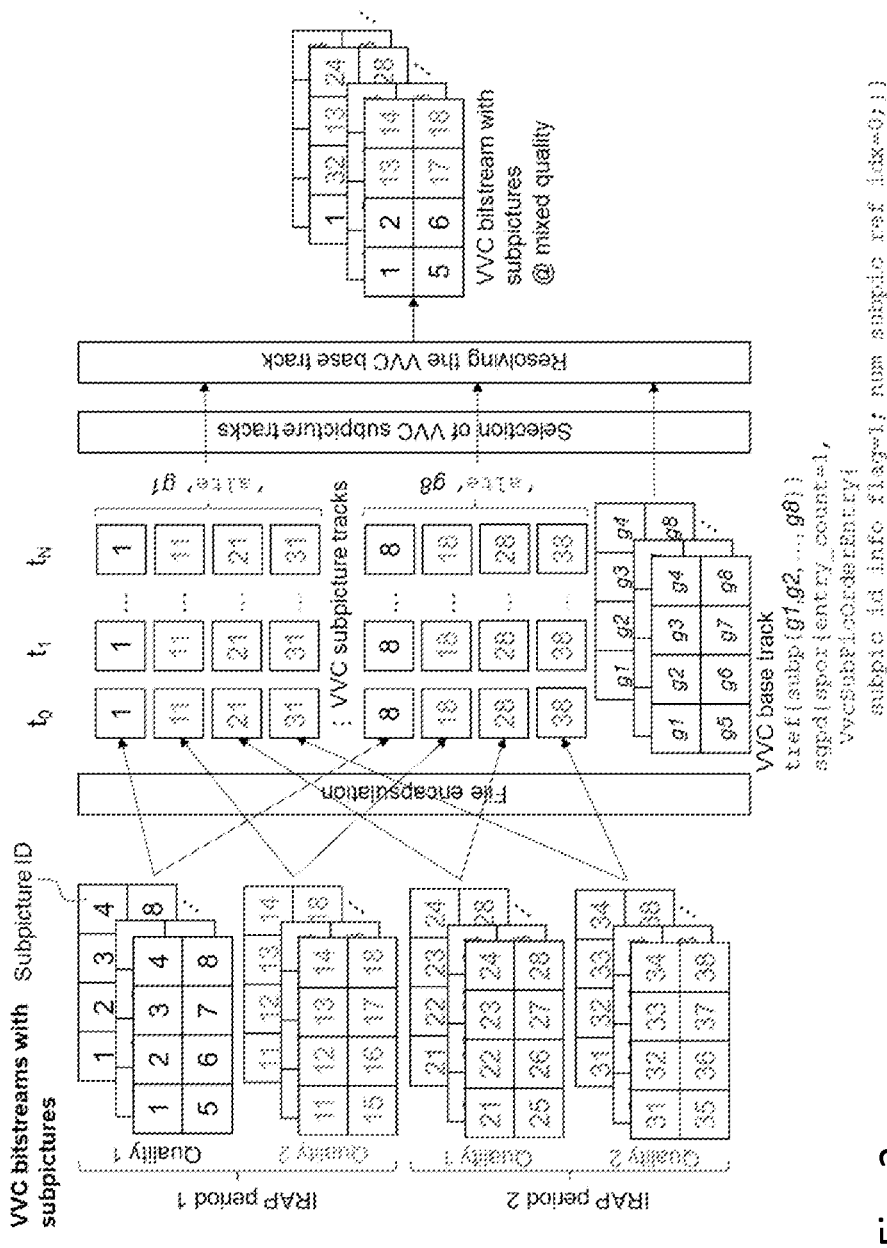
FIG. 2 shows an example of mixed-quality subpicture merging.

FIG. 2 illustrates an example on how VVC subpicture tracks can be used for mixed-quality viewport-dependent omnidirectional video streaming. In this example, the content is coded at two different IRAP picture periods, where the short IRAP period version (IRAP period 2) is intended to be used for reacting to viewport changes and the long IRAP period version (IRAP period 1) provides better compression performance. The example is described as follows:

Encoding: A 4×2 tile grid has been used in forming of the subpictures for pictures of equirectangular projection (ERP). Two VVC bitstreams originating from the same source content are encoded at different picture qualities and bitrates and two different IRAP picture periods.

Creation of VVC subpicture tracks: Each coded subpicture sequence is included in one VVC subpicture track. Each set of VVC subpicture tracks that represents the same content, i.e. have the same position within the ERP picture, have the same prediction hierarchy but different subpicture IDs and are indicated to be members of the same 'alte' track group. The track_group_id values g1, . . . , g8 are uniquely selected and are not equal to any track_ID value.

Creation of a VVC base track: The VVC base track contains a track reference of type 'subp' listing all the track group_id values g1, . . . , g8. The VVC base track also contains a 'spor' sample group with a single sample group description entry that contains subpic_id_info_flag equal to 1 indicating that subpicture ID rewriting in parameter sets is needed and num_subpic_ref_idx equal to 0 indicating that the ID list in the 'subp' track reference provides the merging order of the referenced VVC subpicture tracks. The 'spor' sample group description entry is indicated to be the default that applies to all samples of the track.

Player operation: A player chooses the quality at which each VVC subpicture track among the same 'alte' track group is received based on the viewing orientation. In this example the player first receives VVC subpicture tracks 1, 2, 5, and 6 at a particular quality and VVC subpicture tracks 13, 14, 17, and 18 at another quality. At time $t_M$, a new selection of VVC subpicture tracks is made to respond to a viewing orientation change, and tracks 1, 5, 13, and 17 are continued to be received from IRAP period 1 (long IRAP period version), whereas tracks 32, 36, 24, and 28 are received from IRAP period 2. At time $t_M$ the reader uses the 'minp' sample group for concluding the presence of mixed VCL NAL units in a coded picture and modifies the picture parameter set accordingly. The VVC base track is used to reconstruct a VVC bitstream that could be decoded with a single VVC decoder.

Figure 3:
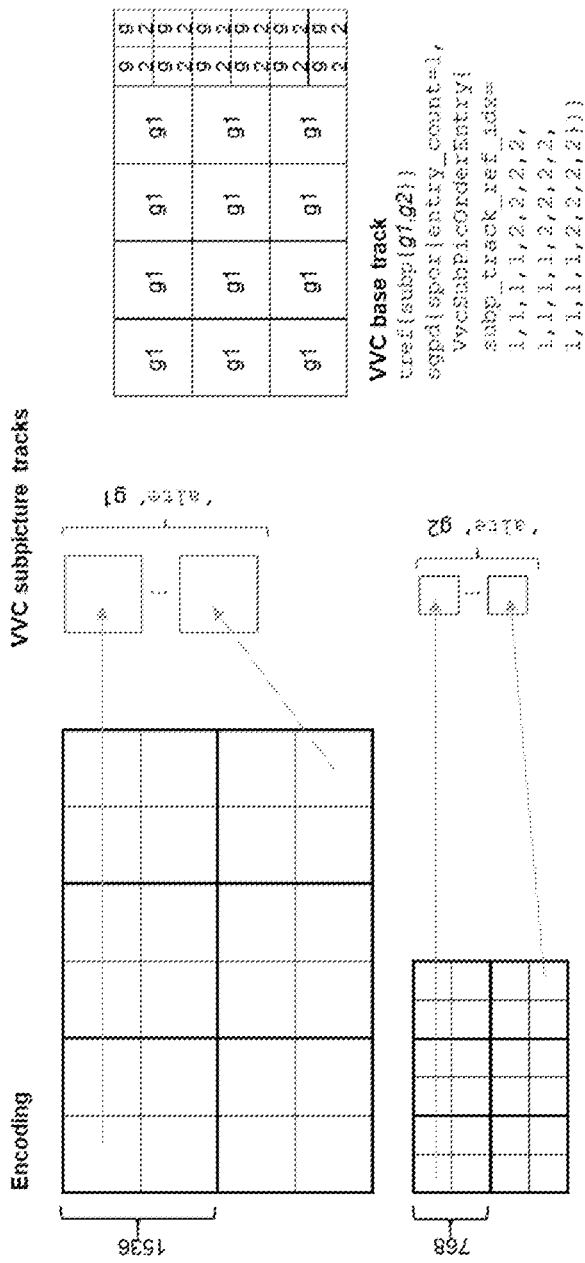
FIG. 3 shows an example of mixed-resolution subpicture merging.

FIG. 3 illustrates an example on how VVC subpicture tracks could be used for mixed-resolution viewport-dependent omnidirectional video streaming. The example is described as follows:

Encoding: Cubemap content is encoded at two spatial resolutions with cube face size 1536×1536 and 768×768, respectively. In both bitstreams a 6×4 subpicture grid is used.

Creation of VVC subpicture tracks: Each coded subpicture sequence is stored as a VVC subpicture track. All VVC subpicture tracks that have the same width and height are indicated to be members of the same 'alte' track group. The track_group_id values g1 and g2 are uniquely selected and are not equal to any track_ID value.

Creation of a VVC base track: The SPS of the VVC base track specifies a subpicture layout illustrated in the figure. The VVC base track contains a track reference of type 'subp' listing the track_group_id values g1 and g2. The VVC base track also contains a 'spor' sample group with a single sample group description entry that contains a list of indices to the 'subp' track reference and is indicated to be the default that applies to all samples of the track.

Player operation: A player chooses subpictures that cover the viewport from the high-resolution encoding and the remaining subpicture from the low-resolution encoding. 12 VVC subpicture tracks originating from the high-resolution bitstream are selected and the complementary 12 VVC subpicture tracks originate from the low-resolution bitstream.

VVC NAL unit configuration box is indicated in VvcNALConfigBox that carries the LenghSizeMinusOne field used for indicating the byte count of the NalUnitLengthField that delimits NAL units. VvcNALConfigBox is intended to be used in container structures where an entire VvcConfigurationBox is unnecessary. The syntax is given in the following:

```
class VvcNALUConfigBox extends
FullBox('vvnC',version=0,flags=0) {
    unsigned int(6) reserved=0;
    unsigned int(2) LengthSizeMinusOne;
}
``` where LengthSizeMinusOne plus 1 indicates the length in bytes of the NALUnitLength field used for indicating the byte count of the NalUnitLengthField that delimits NAL units. The value of this field shall be one of 0, 1, or 3 corresponding to NalUnitLengthField of 1, 2, or 4 bytes, respectively. lengthsizeMinusOne shall have the same value in all instances of VvcConfigurationBox and VvcNALU-ConfigBox contained in the sample entries referenced by the samples used for reconstructing a VVC bitstream.

When a VVC subpicture track does not contain a conforming VVC bitstream, a 'vvs1' sample entry is used for the VVC subpicture track, and the following constraints apply for the track:

The track_in movie flag shall be equal to 0.

The track shall contain one and only one sample entry.

The track shall be referenced by at least one VVC base track through the 'subp' track reference.

The track shall not be referenced by any VVC base track though a 'recr' track reference.

DCI, OPI, VPS, SPS, PPS, AUD, PH, EOS, EOB and other AU- or picture-level non-VCL NAL units shall be absent both in the sample entry and in the samples of 'vvs1' tracks.

Unless indicated otherwise, child boxes of video sample entries (such as CleanApertureBox and PixelAspectRatioBox) should not be present in the sample entry and, if present, shall be ignored.

A sample shall not be marked as a sync sample unless all the VCL NAL units it contains conform to the sync sample requirements.

The composition time offset information for samples of a 'vvs1' track shall not be present.

Subsample information for samples of a 'vvs1' track may be present; if present, the subsample information shall follow the definition of sub-samples for VVC.

The sample entry of type 'vvs1' shall contain VvcNALU-ConfigBox. When the VVC subpicture track is referenced by a VVC base track containing a 'spor' sample group description entry having subpic_id_info_flag equal to 1, the VVC subpicture track shall contain a subpicture ID sample group description, potentially using the default sample group description index.

Subpicture ID sample group may be present in such VVC tracks and VVC subpicture tracks that contain one or more VVC subpictures with sh_subpic_id present in the slice headers. This sample group shall not be present in tracks that do not contain VVC subpictures with sh_subpic_id present in the slice headers. Each sample group description entry indicates a list of one or more subpicture ID values in decoding order that are contained in samples mapped to this sample group description entry. The following syntax may be used:

```
aligned(8) class VvcSubpicIDEntry( ) extends
VisualSampleGroupEntry('spid')
{
    unsigned int(1) rect_region_flag;
    bit(2) reserved = 0;
    unsigned int(1) continuous_id_flag;
    unsigned int(12) num_subpics_minus1;
    for (i = 0; i <= num_subpics_minus1; i++) {
        if ((continuous_id_flag && i == 0) ||
!continuous_id_flag)
            unsigned int(16) subpic_id[i] ;
        if (rect_region_flag)
            unsigned int(16) groupID[i] ;
    }
}
``` where rect_region_flag equal to 0 specifies that no association information to rectangular regions is provided for the subpictures contained in the sample mapped to this sample group description entry. rect_region_flag equal to 1 specifies that association information to rectangular regions is provided for the subpictures contained in the sample mapped to this sample group description entry. num_subpics_minus1 plus 1 specifies the number of WC subpictures contained in the sample mapped to this sample group description entry. subpic_id[i] specifies the i-th subpicture identifier, in decoding order, contained in the sample mapped to this sample group description entry. The value of subpic_id[i] shall not be equal to any other value of subpic_id[j], where i is not equal to j, in the same VvcSubpicIDEntry. When continuous_id_flag is equal to 1, the value of subpic_id[i] for i in the range of 1 to num_subpics_minus1, inclusive, is equal to subpic_id[i−1]+1. groupID[i] specifies unique identifier of the rectangular region associated with the i-th subpicture contained in the sample mapped to this sample group description entry.

Subpicture order sample group is used in WC base tracks with 'subp' track referencing to VVC subpicture tracks. Each sample group description entry indicates the subpictures or slices of a coded picture in decoding order, where each index of the track reference of type 'subp' indicates one or more subpictures or slices that are contiguous in decoding order.

To ease PPS or SPS rewriting in response to subpicture selection, each sample group description entry may contain:
an indication of whether selected subpicture IDs should be changed in PPS or SPS NAL units;
the length (in bits) of subpicture ID syntax elements;
the bit position of subpicture ID syntax elements in the containing RBSP;
a flag indicating whether start code emulation prevention bytes are present before or within subpicture IDs;
the parameter set ID of the parameter set containing the subpicture IDs.

This may have the following syntax:

```
aligned(8) class VvcSubpicOrderEntry( ) extends
Visual SampleGroupEntry('spor')
{
  unsigned int(1) subpic_id_info_flag;
  unsigned int(15) num_subpic_ref_idx;
  for (i = 0; i < num_subpic_ref_idx; i++)
    unsigned int(16) subp_track_ref_idx [i] ;
  if (subpic_id_info_flag) {
    unsigned int(4) subpic_id_len_minus1;
    unsigned int(12) subpic_id_bit_pos;
    unsigned int(1) start_code_emul_flag;
    unsigned int(1) pps_sps_subpic_id_flag;
    if (pps_sps_subpic_id_flag)
      unsigned int(6) pps_id;
    else {
      unsigned int(4) sps_id;
      bit(2) reserved = 0;
    }
  }
}
``` where subpic_id_info_flag equal to 0 specifies that the subpicture ID values explicitly signalled in the SPSs and/or PPSs or inferred without explicit signalling are correct for the indicated set of subp_track_ref_idx[i] values and thus no rewriting of SPSs or PPSs is required. subpic_id_info_flag equal to 1 specifies that SPSs and/or PPSs may need rewriting to indicate the subpictures corresponding to the set of subp_track_ref_idx[i] values and the subpicture ID values are not inferred.

num_subpic_ref_idx greater than 0 specifies the number of reference indices of subpicture tracks or track groups of subpicture tracks referenced by the VVC track. num_subpic_ref_idx equal to 0 specifies that 1) the number of reference indices of subpicture tracks or track groups of subpicture tracks referenced by the VVC track is equal to the number of entries in the 'subp' track reference of the VVC track, and 2) the order of subpicture tracks or track groups of subpicture tracks to be resolved for inclusion into the VVC bitstream reconstructed from the VVC track is the same as the order of the entries in the 'subp' track reference of the VVC track. subp_track_ref_idx[i] specifies a 'subp' track reference index of the i-th list of one or more subpictures or slices to be included in the VVC bitstream reconstructed from the VVC track. subpic_id_len_minus1 plus 1 specifies the number of bits in subpicture identifier syntax elements in PPS or SPS, whichever is referenced by this structure.

subpic_id_bit_pos specifies the bit position starting from 0 of the first bit of the first subpicture ID syntax element in the referenced PPS or SPS RBSP. start_code_emul_flag equal to 0 specifies that start code emulation prevention bytes are not present before or within subpicture IDs in the referenced PPS or SPS NAL unit. start_code_emul_flag equal to 1 specifies that start code emulation prevention bytes may be present before or within subpicture IDs in the referenced PPS or SPS NAL unit.

pps_sps_subpic_id_flag, when equal to 1, specifies that the PPS NAL units applying to the samples mapped to this sample group description entry contain subpicture ID syntax elements. pps_sps_subpic_id_flag, when equal to 0, specifies that the SPS NAL units applying to the samples mapped to this sample group description entry contain subpicture ID syntax elements. pps_id, when present, specifies the PPS ID of the PPS applying to the samples mapped to this sample group description entry.

sps_id, when present, specifies the SPS ID of the SPS applying to the samples mapped to this sample group description entry.

A file reader may reconstruct a VVC bitstream, when one or more of the following condition are met:
i. A VVC bitstream ('vvcb') entity group is present in a file and the file reader processes the VVC bitstream represented by the entity group to generate the output bitstream.
ii. An operating point ('opeg') entity group is present in a file and the file reader uses any of the operating points described by the entity group to generate the output bitstream.
iii. The file reader extracts a subset of the layers or sublayers of a VVC track with ptl_present_flag equal to 1 to generate the output bitstream.
iv. The file reader processes a VVC base track.
v. The file reader processes a VVC track that has an associated VVC non-VCL track.
  1) When condition i, ii, or iii above is true, an operating point is determined at the start of the VVC bitstream and may be determined again for any IRAP or GDR access unit.
  When the file reader either selects an operating point the first time or selects a different operating point than what was selected earlier, the file reader shall indicate the output layer set index and the highest TemporalId value of the selected operating point to the VVC decoder either by including them in an OPI NAL unit inserted into the output bitstream (as the first NAL unit following the AU delimiter NAL unit, if any, in the first access unit where the operating point is taken into use) or by other means.

The subsequent ordered steps apply to the sequence of access units in decoding order starting from an access unit wherein the operating point is determined, inclusive, to the end of the bitstream or the access unit wherein the operating point is determined next time, exclusive, whichever is earlier in decoding order.

2) When a VVC bitstream is represented by multiple VVC tracks, a file parser identifies the tracks needed for the chosen operating point as follows:
   i) When an operating point from the 'opeg' entity group contains the selected operating point, select the tracks that belong to the operating point as indicated by the 'opeg' entity group.
   ii) When an 'opeg' entity group is not present (i.e. when a 'vopi' sample group is present), determine, from the 'vvcb' entity group which VVC tracks represent a VVC bitstream. The first entity_id of the 'vvcb' entity group identifies the track containing the 'vopi' sample group. The mapping of operating points to layers and sublayers is concluded from the 'vopi' sample group. The set of tracks containing the layers and sublayers of the selected operating point and hence needed for decoding the selected operating point are concluded from the 'linf' sample groups present in the VVC tracks of the VVC bitstream.
      Since a particular layer or sublayer may be represented by more than one track, when figuring out the required tracks for an operating point, a selection may need to be made among the set of tracks that all carry the particular layer or sublayer.

3) Access units to the output bitstream are reconstructed in the decoding time order of samples among the VVC tracks needed for the chosen operating point (when condition i, ii, or iii above is true), or within the VVC base track (when condition iv above is true), or within the VVC track (when condition v above is true).
   If several tracks contain data for the access unit, the alignment of respective samples in tracks is performed based on the sample decoding times.
   A sequence of access units is reconstructed from the respective samples in the required tracks by invoking the implicit reconstruction process.
   The reconstructed access units are placed into the output bitstream in increasing order of decoding time.

4) When both of the following conditions are true:
   the sequence of access units is followed by a selection a different operating point than what was selected earlier, and
   the sequence of access units does not end with EOS NAL units in each layer of the applied operating point or an EOB NAL unit, the file reader shall include an EOS NAL unit in each layer of the applied operating point into the output bitstream.

When a VVC bitstream is represented by multiple VVC tracks, the decoding times of the samples shall be such that if the tracks were combined into a single bitstream ordered by increasing decoding time, the access unit order would be correct.

In implicit reconstruction of a VVC bitstream, the reconstruction of an access unit from the time-aligned samples having the current decoding time among:
the required VVC track(s),
the associated VVC non-VCL tracks, if any, and
the referenced VVC subpicture tracks, if any.

When reconstructing a bitstream containing a sublayer for which the VCL NAL units have TemporalId greater than 0, all lower sublayers (i.e., those for which the VCL NAL units have smaller TemporalId) within the same layer are also included in the resulting bitstream.

When the sample(s) with the current decoding time contain VCL NAL units with TemporalId greater than the greatest TemporalId included in the selected operating point, no access unit is reconstructed from the current decoding time.

When reconstructing an access unit, picture units (as specified in ISO/IEC 23090-3) from samples having the same decoding time are placed into the access unit in increasing order of the nuh_layer_id value. The following steps may be performed when the condition applies:
   When a sample of the track containing the first picture unit of a sample is marked as belonging to a sample group 'aud' with ols_idx and lower_ols_idx_inclusive corresponding to the target operating point the AUD NAL unit within the 'aud' sample group is placed into the AU as the first NAL unit of the AU.
   When a sample in a track is marked as belonging to a sample group 'eos' with ols_idx, max_tid and lower_ols_idx_inclusive, corresponding to the target operating point the EOS NAL unit within the 'eos' sample group is placed into the AU at the indicated position, i.e. after the eos position-th NAL unit of the reconstructed AU excluding the AUD NAL unit if inserted by a sample group 'aud'.
   When a sample in a track is marked as belonging to a sample group 'eob' with ols_idx, max_tid, and lower_ols_idx, inclusive, corresponding to the target operating point the EOB NAL unit within the 'eob' sample group is placed into the AU after all NAL units of the AU (including the EOS NAL unit).

When reconstructing an access unit based on an operating point associated with output layer set index i (in the for loop over num_oiss in the 'vopi' sample group), the following applies:
   When reconstructing an access unit, for each layer in the output layer set with index j in the range from 0 to layer_count [i]−1, inclusive, if num_ref_sublayers_in_layer_in_ols[i][j] is greater than 0, then the VCL NAL units belongs to the sublayers of that layer for which the VCL NAL units have TemporalId less than or equal to Min(num_ref_sublayers_in_layer_in_ols[i][j]−1, max_temporal_id), where max_temporal_id is the value of the corresponding syntax element for the operating point, are included in the resulting bitstream and the required tracks are selected accordingly.
   When reconstructing an access unit, for each layer in the output layer set with index j in the range from 0 to layer_count [i]−1, inclusive, if num_ref_sublayers_in_layer_in_ols[i][j] is equal to 0, from all the picture units of the reference layers only IRAP picture units and GDR picture units with ph_recovery_poc_cnt equal to 0 are included in the resulting bitstream and the required tracks are selected accordingly.

If an access unit of a VVC track contains unspecified NAL unit types (NAL units that have nal_unit_type in the certain range, then the unspecified NAL unit types shall be discarded from the final reconstructed bitstream.

When a VVC track contains a 'subp' track reference, each picture unit is reconstructed as specified. When a VVC track contains a 'recr' track reference, each picture unit is reconstructed as specified. The reconstruction process is repeated for each layer of the target operating point in increasing nuh_layer_id order.

The reconstructed access units are placed into the VVC bitstream in increasing order of decoding time.

Since a particular layer or sublayer may be represented by more than one track, when figuring out the required tracks for an operating point, a selection may need to be made among the set of tracks that all carry the particular layer or sublayer.

For reconstructing a picture unit from a sample in a VVC track with 'subp' track reference, A sample of a VVC track is resolved to a picture unit in the following order:
  The AUD NAL unit, when present in the sample or in the time-aligned sample of the associated VVC non-VCL track, is included in the picture unit.
  When the sample is the first sample of a sequence of samples associated with the same sample entry, the DCI, OPI, parameter set and SEI NAL units contained in the sample entry, if any, are included in the picture unit.
  When there is an associated VVC non-VCL track and the picture unit is the first picture unit in this access unit that is reconstructed from the sample, the following NAL units are included in the picture unit:
    If there is at least one NAL unit in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units (excluding the AUD NAL unit, if any) in the time-aligned sample of the associated VVC non-VCL track up to and excluding the first of these NAL units.
    Otherwise all NAL units in the time-aligned sample of the associated VVC non-VCL track.
  If there is at least one NAL unit in the sample with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units in the sample up to and excluding the first of these NAL units are included in the picture unit, otherwise all NAL units in the sample in the picture unit.
  If the reader has selected an operating point, the reader shall exclude any OPI NAL units stored in sample entries and samples from the reconstructed access unit in all of the steps above.
  If the VVC track does not reference VVC subpicture tracks, the NAL units of the sample from the VVC track are included in the picture unit.
  Otherwise, the following applies:
    The track references are resolved as specified.
    Parameter sets are updated when necessary.
    The picture unit is appended by the content of the time-aligned (in decoding time) resolved sample from each referenced VVC subpicture track in the order of the VVC subpicture tracks being referenced in the 'subp' track reference (when num_subpic_ref_idx in the same group entry of the 'spor' sample group entry mapped to this sample is equal to 0) or in the order as specified in the 'spor' sample group description entry mapped to this sample (when num_subpic_ref_idx in the same group entry of the 'spor' sample group entry mapped to this sample is greater than 0), excluding all DCI, OPI, VPS, SPS, PPS, AUD, PH, EOS, EOB NAL units as well as all SEI NAL units that do not contain a scalable nesting SEI message with sn_subpic_flag equal to 1.
    When a referenced VVC subpicture track is associated with a VVC non-VCL track, the resolved sample of the VVC subpicture track contains the following NAL units:
      If there is at least one NAL unit in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units (excluding the AUD NAL unit, if any) in the time-aligned sample of the associated VVC non-VCL track up to and excluding the first of these NAL units.
      Otherwise all NAL units in the time-aligned sample of the associated VVC non-VCL track.
      The NAL units from the sample of the referenced VVC subpicture track.
      The remaining NAL units, if any, from the time-aligned sample of the associated VVC non-VCL track.
    All NAL units in the sample with nal_unit_type equal to EOS_NUT, EOB_NUT, SUFFIX_APS_NUT, SUFFIX_SEI_NUT, FD_NUT, or RSV_NVCL_27.
    When there is an associated VVC non-VCL track and the picture unit is the last picture unit in this access unit that is reconstructed from the sample, all NAL units in in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27.
    All NAL units or NAL unit like structures in the sample with nal_unit_type in a predefined range, inclusive, shall be discarded.

For resolving subpicture track references, it is determined if num_subpic_ref_idx in the 'spor' sample group description entry mapped to this sample is equal to 0, each track reference in the 'subp' box is resolved as follows. Otherwise, the track reference track_IDs[subp_track_ref_idx[i]] in the 'subp' TrackReferenceTypeBox is resolved for each instance of subp_track_ref_idx[i] in the 'spor' sample group description entry mapped to this sample as follows.
  If the track reference points to a track ID of a VVC subpicture track, the track reference is resolved to the VVC subpicture track.
  Otherwise (the track reference points to an 'alte' track group), the track reference is resolved to any of the tracks of the 'alte' track group.
  The track reference shall not be resolved to a particular subpicture track more than once per a single picture unit.
  When a particular track reference index value was resolved to a particular track in the previous sample, it shall be resolved in the current sample to either of the following:

the same particular track, or any other track in the same 'alte' track group that contains a sync sample that is time-aligned with the current sample.

For a parameter set updating, if a reader selects VVC subpicture tracks containing VVC subpictures with a set of subpicture ID values that is the initial selection or differs from the previous selection, the following steps are taken:

The 'spor' sample group description entry is studied to conclude whether a PPS or SPS NAL unit needs to be changed.

If the 'spor' sample group description entry indicates that start code emulation prevention bytes are present before or within the subpicture IDs in the containing NAL unit, an RBSP is derived from the NAL unit (i.e., start code emulation prevention bytes are removed). After the overriding in the next step, start code emulation prevention is re-done.

The reader uses the bit position and subpicture ID length information in the 'spor' sample group entry to conclude which bits are overwritten to update the subpicture IDs to the selected ones.

When the subpicture ID values of a PPS or SPS are initially selected, the reader needs to rewrite the PPS or SPS, respectively, with the selected subpicture ID values in the reconstructed access unit.

When the subpicture ID values of a PPS or SPS are changed compared to the previous PPS or SPS (respectively) with the same PPS ID value or SPS ID value (respectively), the reader needs to include a copy of that previous PPS and SPS (if the PPS or SPS with that same PPS or SPS ID value, respectively, is not present in the access unit otherwise) and rewrite the PPS or SPS (respectively) with the updated subpicture ID values in the reconstructed access unit.

When there is a 'minp' sample group description entry mapped to the sample of the VVC base track, the following operations are applied:

The 'minp' sample group description entry is studied to conclude the value of pps_mixed_nalu_types_in_pic_flag as follows:

The following examination is performed for each pair of track ID values of subpicture tracks selected to reconstruct a picture unit to determine whether they map to the track reference mix_subp_track_idx1[i] or mix_subp_track_idx2[i] in the 'minp' sample group description entry mapped to this sample:

If the track reference points to the track ID directly, the track ID maps to mix_subp_track_idx1[i] or mix_subp_track_idx2[i].

Otherwise, if both of the following are true:

the track reference points to an 'alte' track group or a 'snut' track group, and the 'alte' track group or the 'snut' track group, respectively, contains a track having the track ID value, the track ID value maps to mix_subp_track_idx1 [i] or mix_subp_track_idx2[i].

Otherwise, the track ID value does not map to mix_subp_track_idx1[i] or mix_subp_track_idx2 [i].

If any pair of subpicture tracks selected to reconstruct a picture unit have track ID values that map to mix_subp_track_idx1[i] and mix_subp_track_idx2 [i] with the same value of i, pps_mixed_nalu_types_in_pic_flag is concluded to be equal to 1.

Otherwise, pps_mixed_nalu_types_in_pic_flag is concluded to be equal to 0.

If the value of pps_mixed_nalu_types_in_pic_flag differs from that in the previous PPS NAL unit with the same PPS ID in the reconstructed bitstream, the following applies:

When no PPS was included in the picture unit by the steps above, the reader needs to include a copy of the PPS with the updated pps_mixed_nalu_types_in_pic_flag value in the reconstructed picture unit.

The reader uses the bit position in the 'minp' sample group entry to conclude which bit is overwritten to update the pps_mixed_nalu_types_in_pic_flag.

For reconstructing a picture unit from a sample in a VVC track with 'recr' track reference, a sample of a VVC track is resolved to a picture unit in the following order:

The AUD NAL unit, when present in the sample.

When the sample is the first sample of a sequence of samples associated with the same sample entry, the parameter set and SEI NAL units contained in the sample entry, if any.

If there is at least one NAL unit in the sample with nal_unit_type equal to EOS_NUT, EOB_NUT, SUFFIX_APS_NUT, SUFFIX_SEI_NUT, FD_NUT, RSV_NVCL_27, UNSPEC_30, or UNSPEC_31 (a NAL unit with such a NAL unit type cannot precede the first VCL NAL unit in a picture unit), the NAL units in the sample up to and excluding the first of these NAL units, otherwise all NAL units in the sample.

The picture unit is appended by the content of the time-aligned (in decoding time) sample with NAL units of the resolved regions from the referenced VVC track being referenced in the 'recr' track reference. The order of NAL units is specified by the order of regions in the 'rror' sample group description entry mapped to this sample. The NAL units are resolved as specified below.

Each region is resolved to the rectangular region indicated by region_idx[i] in 'rror' sample group description entry mapped to this sample as specified below.

If the value of region_idx[i] is not corresponding to any alternate_region_set_id[j] defined in the 'rror' sample group description entry, the resolved region corresponds to the rectangular region with unique identifier groupID equal region_idx[i].

Otherwise (region_idx[i] is equal to a value of alternate_region_set_id[j] defined in the 'rror' sample group description entry), the region is resolved to any rectangular region with unique identifier groupID equal to any value of groupID[j][k] that belong to the alternate region set with alternate_region_set_id[j] equal to region_idx[i], and if a particular region_idx[i] value was resolved to a particular region in the previous sample, it shall be resolved in the current sample to any other either of the following:

the same particular region, or any other region in the same alternate region set that contains a sync sample that is time-aligned with the current sample.

NAL units of the resolved regions are identified by groupID in the 'nalm' sample group description entry mapped to the time-aligned sample in referenced VVC track.

All NAL units in the sample with nal_unit_type equal to EOS_NUT, EOB_NUT, SUFFIX_APS_NUT, SUF- FIX_SEI_NUT, FD_NUT, RSV_NVCL_27, UNSPEC_30, or UNSPEC_31.

If a reader selects regions containing VVC subpictures with a set of subpicture ID values that is the initial selection or differs from the previous selection, the following steps may be taken:

The 'rror' sample group description entry is studied to conclude whether a PPS or SPS NAL unit needs to be changed.

If the 'rror' sample group description entry indicates that start code emulation prevention bytes are present before or within the subpicture IDs in the containing NAL unit, an RBSP is derived from the NAL unit (i.e., start code emulation prevention bytes are removed). After the overriding in the next step, start code emulation prevention is re-done.

The reader uses the bit position and subpicture ID length information in the 'rror' sample group entry to conclude which bits are overwritten to update the subpicture IDs to the selected ones.

When the subpicture ID values of a PPS or SPS are initially selected, the reader needs to rewrite the PPS or SPS, respectively, with the selected subpicture ID values in the reconstructed access unit.

When the subpicture ID values of a PPS or SPS are changed compared to the previous PPS or SPS (respectively) with the same PPS ID value or SPS ID value (respectively), the reader needs to include a copy of that previous PPS and SPS (if the PPS or SPS with that same PPS or SPS ID value, respectively, is not present in the access unit otherwise) and rewrite the PPS or SPS (respectively) with the updated subpicture ID values in the reconstructed access unit.

Samples of a track can be linked to one more metadata items using the sample-to-item sample grouping. The MetaBox containing the referred items is resolved as specified in the semantics below. The sample-to-item sample grouping is allowed for any types of tracks, and its syntax and semantics are unchanged regardless of the track handler type. In the absence of this sample group, the entire track-level MetaBox, if any, is applicable to every sample. The following syntax may be used:

```
class SampleToMetadataItemEntry( )
extends SampleGroupDescriptionEntry('stmi') {
    unsigned int(32) meta_box_handler_type;
    unsigned int(32) num_items;
    for(i = 0; i < num_items; i++) {
        unsigned int(32) item_id[i];
    }
}
``` wherein meta_box_handler_type informs about the type of metadata schema used by the MetaBox which is referenced by the items in this sample group. When there are multiple MetaBoxes with the same handler types, the MetaBox referred to in this sample group entry is the first MetaBox fulfilling one of the following ordered constraints:

A MetaBox included in the current track, with handler_type equal to meta_box_handler_type.

A MetaBox included in MovieBox, with handler_type equal to meta_box_handler_type.

A MetaBox included in the root level of the file, with handler type equal to meta_box_handler_type.

num_items counts the number of items referenced by this sample group. item_id[i] specifies the item_ID value of an item that applies to or is valid for the sample mapped to this sample group description entry.

In an approach for viewport-dependent streaming using VVC, subpicture tracks are selected by players. To achieve a small motion-to-high-quality latency, players keep the buffer occupancy level low. Consequently, all subpictures of a picture should be received within a limited time to reconstruct a coded picture to be decoded. Decoding and playback could be interrupted by delayed transmission of only one subpicture. Yet, the delayed subpicture might not even fall into the viewport area and hence might not be displayed. Playback interruptions are perceptually disturbing.

As another problem, there are not suitable subpicture to match a subpicture location in a subpicture layout. This problem can be clarified through an example:

Encoding: The equirectangular projection (ERP) video content is rotated by 90° and then encoded at two spatial resolutions, namely 5120×10240 and 3200×6400, and with 2×5 subpicture grid, yielding subpictures of size 2560×2048 and 1600×1280, respectively. 2×1 tile grid may be used, and each subpicture may consist of exactly one slice.

Figure 4:
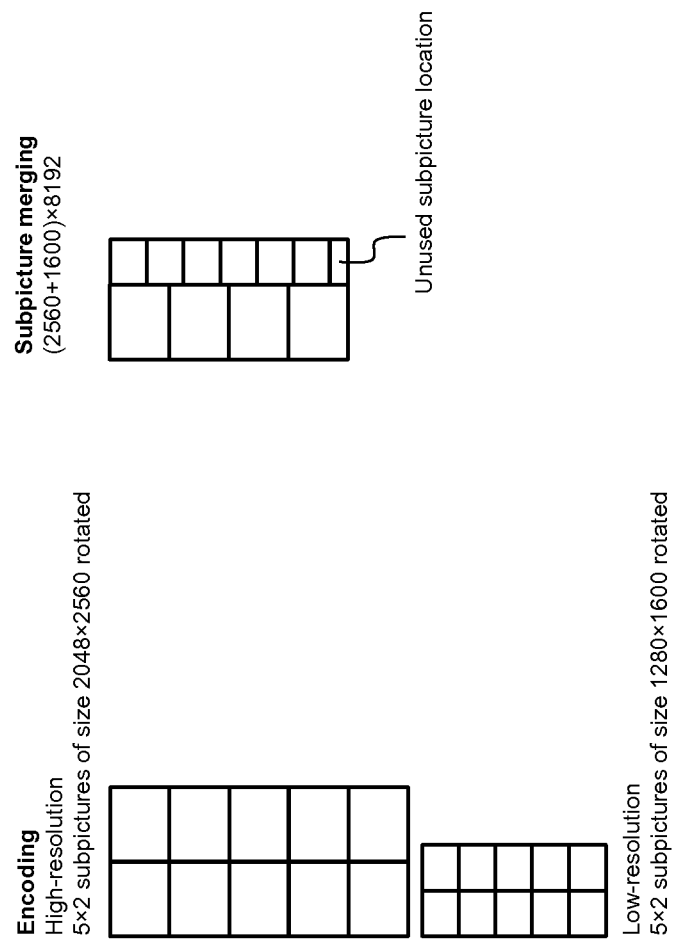
FIG. 4 shows an example of unused subpicture locations in the subpicture layout.

Subpicture merging: Four high-resolution subpictures are selected for merging. When the viewing orientation is towards the equator, the four high-resolution subpictures cover an azimuth range of approximately 144°. Six low-resolution subpictures are selected so that the entire sphere is covered by the selected subpictures. Subpictures are merged to a subpicture layout as depicted in FIG. 4, which conforms to VVC Level 6, 6.1 or 6.2 (for 30, 60, or 120 frames per second, respectively). FIG. 4 also indicates that the bottom-right subpicture in the layout is covered by none of the high- or low-resolution subpictures. The bottom-right subpicture anyhow needs to be included in the VVC bitstream since otherwise the bitstream would not be conforming.

In video coding, an isolated region may be defined as a image region that is allowed to depend only on the corresponding isolated region in reference pictures and does not depend on any other picture regions in the current picture or in the reference pictures. The corresponding isolated region in reference pictures may be for example the image region that collocates with the isolated region in a current picture. A coded isolated region may be decoded without the presence of any image regions of the same coded picture.

Pictures, whose isolated regions are predicted from each other, may be grouped into an isolated-region picture group. An isolated region can be inter-predicted from the corresponding isolated region in other pictures within the same isolated-region picture group, whereas inter prediction from other isolated regions or outside the isolated-region picture group may be disallowed.

A leftover region (a.k.a. non-isolated region) may be defined as an image region that is not constrained like an isolated region and thus may be predicted from image regions that do not correspond to the leftover region itself in the current picture or reference pictures.

An motion-constrained tile set (MCTS) is such that the inter prediction process is constrained in encoding such that no sample value outside the MCTS, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. In HEVC, this may be enforced by turning off temporal motion vector prediction of HEVC, or by disallowing the encoder to use the temporal motion vector prediction (TMVP) candidate or any motion vector prediction candidate following the TMVP candidate in a motion vector candidate list for prediction units located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets. An MCTS is an example of an isolated region.

The present embodiments are targeted to the identified problems, and provide a solution relating to substitute image regions. As an example of a substitute image region, the following embodiments use subpicture. However, it is appreciated that any image region can be used instead, for example motion-constrained tile sets.

In addition, the following embodiments are discussed with reference to H.266/VVC. It is appreciated that the embodiments similarly apply to other codecs.

In addition, the following embodiments are discussed with reference to H.266/VVC syntax. It is appreciated that the embodiments similarly apply to respective syntax in other codecs.

In addition, some of the following embodiments are discussed with reference to carriage of metadata in a container file or media presentation description or decoding metadata from a container file or media presentation description. It needs to be understood that embodiments similarly apply to carriage of metadata within video bitstream(s) or decoding metadata from video bitstream(s).

In addition, some of the following embodiments are discussed with reference to binding of H.266/VVC into ISOBMFF, specified in ISO/IEC 14496-15. It is appreciated that the embodiments similarly apply to respective concepts or syntax in the binding of other codecs into ISOBMFF.

In addition, some of the following embodiments are discussed with reference to ISOBMFF. It is appreciated that the embodiments similarly apply to respective concepts or syntax in other container file formats.

In addition, some of the following embodiments are discussed with reference to delivery of ISOBMFF tracks over a network. It is appreciated that the embodiments similarly apply to respective concepts or syntax in other delivery mechanisms, such as delivery of coded video using the Real-time Transport Protocol specified by IETF or in the MPEG-2 Transport Stream.

The present embodiments provide a method and technical equipment for both a method for authoring metadata and a method for using metadata. The metadata is created and indicated e.g. in a video bitstream, a container file or a media presentation description (MPD). Some embodiments are discussed with reference to DASH MPD. It is appreciated that the embodiments similarly apply to other media presentation description formats or protocols, such as the Session Description Protocol (SDP) by the Internet Engineering Task Force (IETF) or the HTTP live streaming playlist format specified in IETF RFC 8216, and the respective syntax in the media presentation description format or protocol.

The metadata comprises the following:
indication of a video bitstream format wherein one or more subpictures are allowed in a picture of a video bitstream;
indication of at least a first substitute subpicture;
indication of mapping information to locate the first substitute subpicture in the picture.

According to an embodiment, a first video bitstream, comprising the first substitute subpicture at a location specified by the mapping information, conforms to the video bitstream format.

According to an embodiment, the mapping information to locate the first substitute subpicture in the picture may be indirect and may indicate which subpictures the first substitute subpicture is eligible to substitute.

According to an embodiment, the indication of at least the first substitute subpicture implies that the first substitute subpicture is intended to be included in the picture when no other subpictures are available for the location.

According to an embodiment, the indication of at least the first substitute subpicture implies that the first substitute subpicture is not intended for displaying.

According to an embodiment, the first substitute subpicture is included in the picture when no other subpictures are available for the location. The first substitute subpicture may be included in the picture when another subpicture is not received early enough, e.g. based on a decoding time of a picture, or a buffer occupancy level falls below a threshold.

Figure 5:
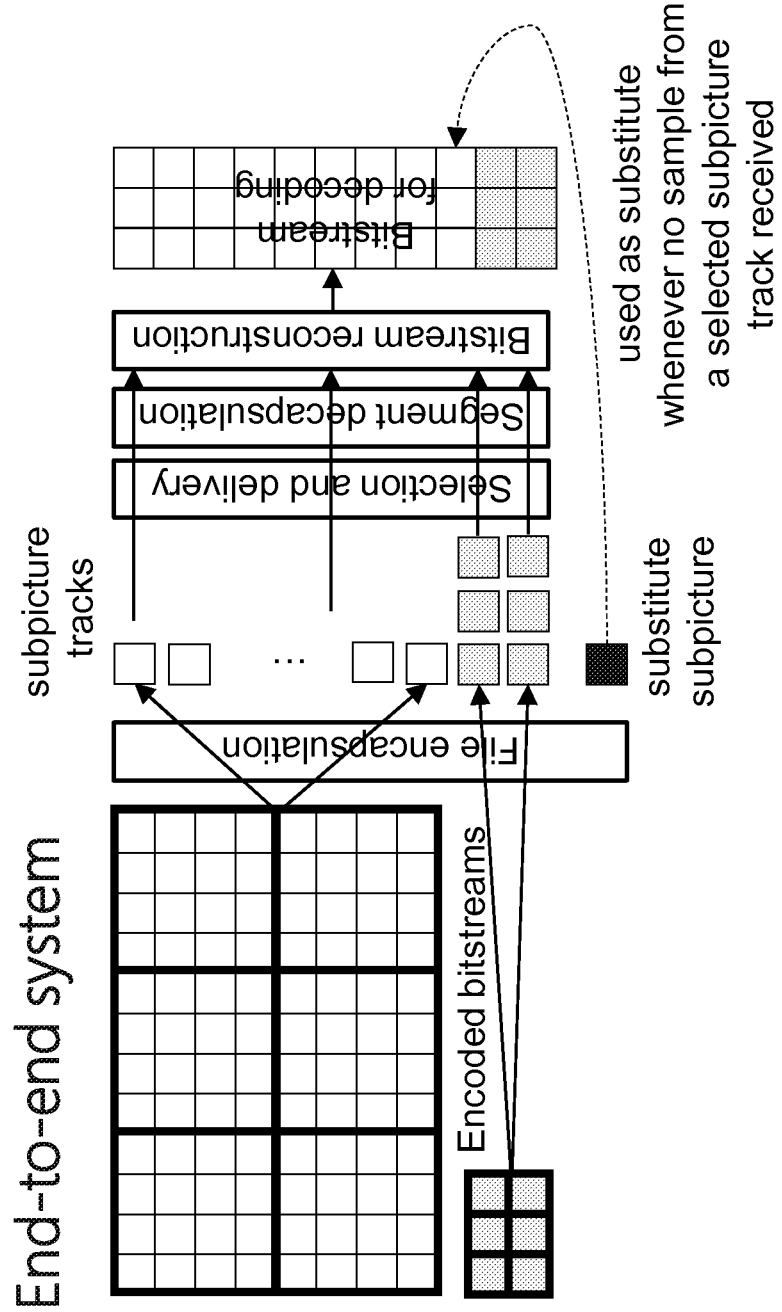
FIG. 5 shows an example of an end-to-end system.

FIG. 5 illustrates an example of a present solution. In the example, a cubemap video is coded with two resolutions, each resolution having subpictures of equal size. Each coded subpicture sequence is stored as VVC subpicture track. High-resolution subpicture tracks are delivered as selected by the player so that they cover a viewport, and all low-resolution subpicture tracks are additionally delivered. In addition, a substitute subpicture is made available and delivered to the player. The player uses a substitute subpicture in the bitstream for decoding whenever delivery of any of the selected subpicture tracks is not received early enough.

According to an embodiment, in response to the indication of at least the first substitute subpicture, the first substitute subpicture is omitted from displaying.

According to an embodiment, the method additionally comprises encoding a first substitute subpicture. The encoding may comprise encoding one or more slices for the first substitute subpicture. According to an embodiment, a substitute subpicture is coded as an intra slice that represents a constant colour. The coded residual signal may be absent or zero in a substitute subpicture. According to an embodiment, a substitute subpicture is encoded as an IRAP subpicture. The IRAP subpicture may be coded with reference to a picture parameter set (PPS) with pps_rpl_info_in_ph_flag equal to 1 as specified in H.266/VVC.

The indication of a video bitstream format wherein one or more subpicture are allowed in a picture of a video bitstream may comprise, but is not limited to, one or more of the following:
indicating in one or more high-level syntax structures of the video bitstream, e.g. within a sequence parameter set that one or more subpictures are allowed. For example, in H.266/VVC syntax sps_subpic_info_present_flag may be set equal to 1 and sps_num_ subpics_minus1 plus 1 may be set to indicate the number of subpictures within a picture.

indicating in a file format that a track represents or resolves into a video bitstream format wherein one or more subpictures are allowed. For example, the presence of a track reference a particular type within a track may indicate that resolves into a video bitstream format wherein one or more subpictures are allowed. For example, as specified in ISO/IEC 14496-15, a VVC base track contains a 'subp' track reference and represents a VVC bitstream that is formed by merging the referenced VVC subpicture tracks.

Indicating in a media presentation description, such as DASH MPD, for one or more Representations or streams that they represent or resolve into a video bitstream format wherein one or more subpictures are allowed.

The indication of at least a first substitute subpicture may comprise or may be associated with a coded representation of the first substitute subpicture.

Embodiments Based on a Substitute Subpicture Track

Embodiments based on a substitute subpicture track are described next. The metadata according to the embodiments has the following features:

Coded representation(s) of substitute subpicture(s) are present in sample(s) of a VVC subpicture track, such as 'vvs1' VVC subpicture track.

The indication of at least a first substitute subpicture, i.e., the indication that the substitute subpicture track provides substitute subpictures, may comprise (but is not necessarily limited to) one or more of the following:

New box in the sample entry of the VVC subpicture track;

Dedicated box header flag of VvcNALUConfigBox (which is contained in the sample entry) or of any other box contained in the sample entry;

New field in VvcNALUConfigBox or in any other box contained in the sample entry;

A new part of codecs MIME parameter for the sample entry of the VVC subpicture track, which may be specific to 'vvs1' sample entry type;

A new optional MIME parameter;

A new element or attribute in a media description, such as DASH MPD;

A new track group type;

A new bit in the flags field in the header of the 'alte' box; e.g. bit equal to 1 indicating a substitute subpicture or alike;

A new field extending the 'alte' box;

A new track reference type from/to substitute track to/from subpicture track;

A new bit in the flags field of the TrackHeaderBox is used in indicating if the track contains presentable data, e.g., 0 indicating presentable data and 1 indicating non-presentable data; consequently, value 1 is used for substitute subpicture tracks.

In an embodiment, a dedicated box header flag of VvcNALUConfigBox (which is contained in the sample entry) may be used for the indication of at least a first substitute subpicture is specified as follows (where & indicates a bit-wise AND operation and 0x indicates a hexadecimal value): (flags & 1) equal to 1 in a VvcNALUConfigBox included in a 'vvs1' sample entry indicates that the samples referencing the sample entry do not contain content intended for displaying.

According to an embodiment, the mapping information comprises an 'alte' track group containing the substitute subpicture track together with those conventional VVC subpicture tracks that it substitutes.

According to an embodiment, any embodiment for authoring metadata further comprises authoring the metadata as discussed above.

According to an embodiment, any embodiment for using metadata further comprises using the metadata as discussed above. For example, the metadata may be used for one or more of the following purposes:

When a subpicture is not received early enough for reconstructing a coded picture to be decoded, the metadata may be used to identify and include a substitute subpicture in the coded picture to be decoded.

When a subpicture layout contains a location for which no subpicture is encoded, a substitute subpicture may be placed in the coded picture in that location and the coded picture may then be decoded.

A substitute subpicture may be treated in a rendering process so that its displaying is omitted.

The sample duration of a substitute subpicture track may be greater than or equal to that of the VVC base track or conventional VVC subpicture tracks. According to an embodiment, the duration of a sample in a substitute subpicture is set to cover the durations of a sequence of samples that it can substitute in all the tracks in the same 'alte' group. According to an embodiment, the duration of a sample in a substitute subpicture track is set to cover a Subsegment. According to an embodiment, in the bitstream reconstruction process, the time-aligned sample from a substitute subpicture track is a sample with matching or "ongoing" sample time compared to that of a current sample in the VVC base track. The current sample in the VVC base track may be the sample that is currently processed for reconstructing the respective access unit of a video bitstream. In an embodiment, a sample in a substitute subpicture track may have a matching or "ongoing" sample time compared to that in the current sample in the VVC base track, when the decoding time of a sample in the substitute subpicture track is the largest decoding time present in the track that is less than or equal to the decoding time of the current sample in the VVC base track. In an embodiment, time-aligned samples may be defined as follows: A time-aligned sample in each required VVC track or each associated VVC non-VCL track, if any, is the sample with the same decoding time as the current decoding time. A time-aligned sample in each referenced VVC subpicture track, if any, is the sample that has the greatest decoding time that is less than or equal to the current decoding time. In an embodiment, a sample in a substitute subpicture track may have a matching or "ongoing" sample time compared to that in the current sample in the VVC base track, when the composition time of a sample in the substitute subpicture track is the largest composition time present in the track that is less than or equal to the composition time of the current sample in the VVC base track.

According to an embodiment, the same coded representation of a substitute subpicture is referenced by multiple samples of a substitute subpicture track.

A substitute subpicture track may have the same sample decoding and composition times compared to those of the VVC base track and/or VVC subpicture tracks.

According to an embodiment, a substitute subpicture track may be mapped to different subpicture locations in time, based on the best visually matching location. Samples of the subpicture track may be grouped to indicate such spatial mapping, having a single spatial mapping active per-sample per-time.

According to an embodiment, several substitute subpicture tracks may be grouped with track groups and/or entity groups.

Embodiments for Player Operation

Figure 6:
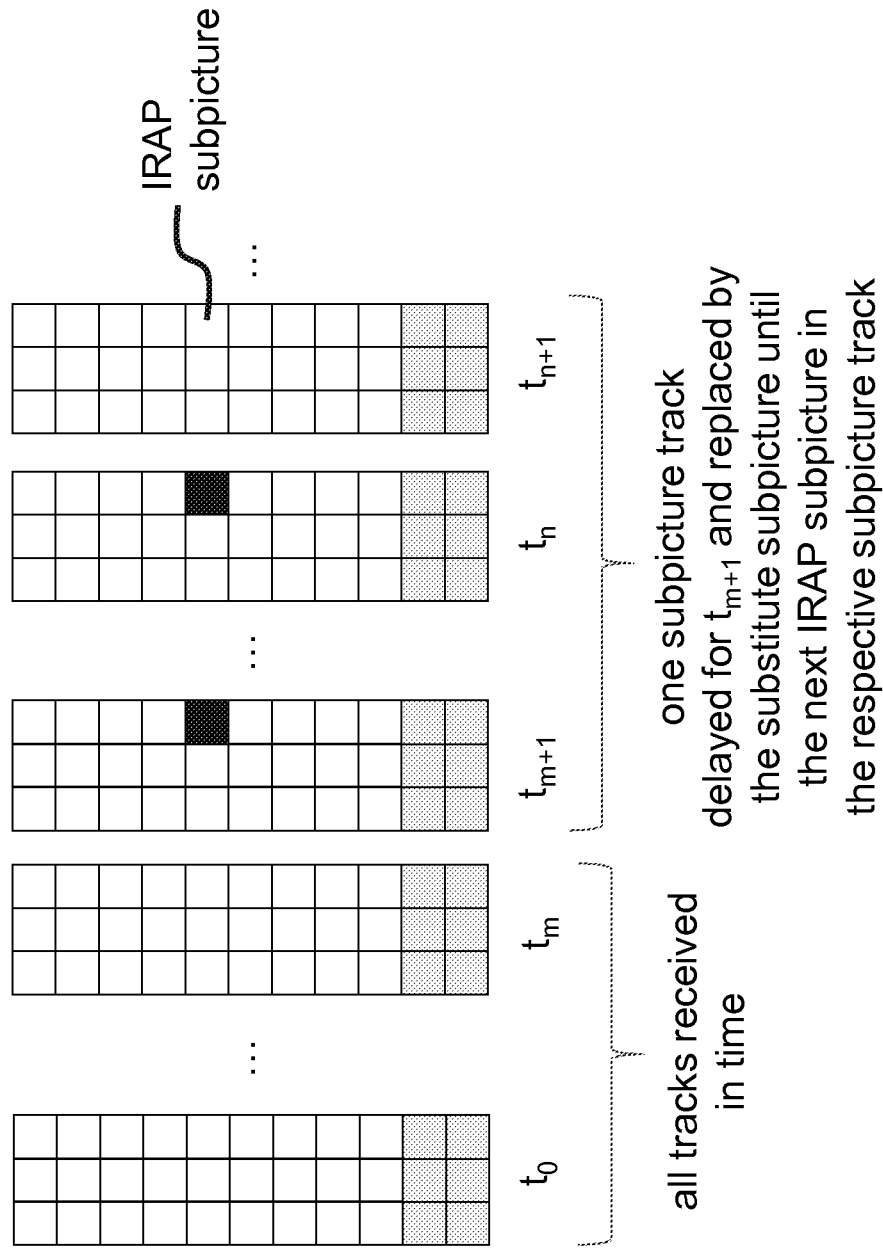
FIG. 6 shows an example of a player operation.

FIG. 6 illustrates an example of player operation. According to an embodiment, a player switches back to a subpicture track from a substitute subpicture when the subpicture track has an IRAP subpicture and the subpicture track is received early enough.

If the IRAP subpicture used to switch back to a subpicture track is a CRA subpicture, then rendering does not use any decoded associated RASL subpictures, or all associated RASL subpictures are replaced by substitute subpictures before decoding.

According to an embodiment, if the same substitute subpicture is included multiple times in the same picture, the subpicture identifier (ID) value contained in some copies of the substitute subpicture(s) is rewritten so that all subpictures in the same picture have a unique subpicture identifier value.

When using H.266/VVC and the same substitute subpicture is included multiple times in the same picture, the sh_subpic_id of some copies of the substitute subpicture(s) is rewritten so that all of the sh_subpic_id values in the same picture are unique. In H.266/VVC, sh_subpic_id is contained in a slice header and specifies the subpicture ID of the subpicture that contains the slice.

According to an embodiment, if the substitute subpicture is not an IRAP subpicture, the subpicture ID value (e.g. the sh_subpic_id value in H.266/VVC) of the substitute subpicture is replaced with the previous subpicture ID value in the same subpicture location. In H.266/VVC. sh_subpic_id is the first syntax element in the slice header. The length of sh_subpic_id in bits is available in the subpicture order ('spor') sample group description entry.

As described, decoded substitute subpictures may be omitted in rendering. When a substitute subpicture replaces another subpicture in a coded picture and that another subpicture would be needed in rendering, a player may operate as follows:
  In some use cases there may be fallback low-resolution background subpicture that covers the another subpicture and can be used in rendering;
  A player may use neural-network-based in-painting, in case there is no background subpicture(s) available or inpainting provides a better visual quality than the background subpicture(s).

Embodiments Based on a Sample Group

According to an embodiment, the indication of at least the first substitute subpicture is a sample group.

According to an embodiment, the sample group may be referred to as substitute subpicture ('susu') sample group and each sample group description entry contains a coded subpicture, which is represented as one or more complete NAL units that for a subpicture. The following syntax may be used:

```
aligned(8) class VvcSubstituteSubpictureEntry( ) extends
Visual SampleGroupEntry('susu')
{
    unsigned int(16) num_nalus_minus1;
    for (j = 0; j <= num_nalus_minus1; j++) {
        unsigned int(24) substitute_nalu_size;
        bit (8 * substitute_nalu_size) substitute_nal_unit;
    }
}
```

In the following, options for mapping of subpicture order sample group to substitute subpictures are described.

According to an embodiment, the subpicture order ('spor') sample group description entry contains, per subpicture index/location, a 'susu' sample group description index of the substitute subpicture that can be used in the absence of a sample of the respective WC subpicture track. This syntax also enables signaling of only substitute subpicture for positions in the subpicture layout to fill in the picture area when subpicture tracks do not fill in a picture without gaps. The following syntax may be used:

```
aligned(8) class VvcSubpicOrderEntry( ) extends
Visual SampleGroupEntry('spor')
{
    unsigned int(1) subpic_id_info_flag;
    unsigned int(15) num_subpic_ref_idx;
    for (i = 0; i < num_subpic_ref_idx; i++) {
        unsigned int(2) substitute_subpic_idc;
        if (substitute_subpic_idc & 1)
            unsigned int(14) subp_track_ref_idx;
        if (substitute_sub_pic_idc & 2) {
            if (substitute_subpic_idc & 1)
                bit (2) reserved = 0;
            unsigned int(14) substitute_subpicture_idx;
        }
    }
    if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_subpic_id_flag;
        if (pps_subpic_id_flag)
            unsigned int(6) pps_id;
        else {
            unsigned int(1) sps_subpic_id_flag;
            unsigned int(4) sps_id;
            bit(1) reserved = 0;
        }
    }
}
```

According to an embodiment, the subpicture order ('spor') sample group description entry contains, per subpicture index/location, a 'susu' sample group description index of the substitute subpicture that can be used in the absence of a sample of the respective VVC subpicture track. This syntax also enables signaling of only substitute subpicture for positions in the subpicture layout to fill in the picture area when subpicture tracks do not fill in a picture without gaps. subp_track_ref_idx equal to 0 may specify that there is no respective VVC subpicture track present and consequently substitute_subpic_flag is equal to 1. The following syntax may be used:

```
aligned(8) class VvcSubpicOrderEntry( ) extends
VisualSampleGroupEntry('spor')
{
    unsigned int(1) subpic_id_info_flag;
    unsigned int(15) num_subpic_ref_idx;
    for (i = 0; i < num_subpic_ref_idx; i++) {
        unsigned int(1) substitute_subpic_flag;
        unsigned int(15) subp_track_ref_idx;
        if (substitute_subpic_flag)
            unsigned int(16) substitute_subpicture_idx;
    }
    if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_subpic_id_flag;
        if (pps_subpic_id_flag)
            unsigned int(6) pps_id;
```

```
        else {
            unsigned int(1) sps_subpic_id_flag;
            unsigned int(4) sps_id;
            bit(1) reserved = 0;
        }
    }
}
```

According to an embodiment, the subpicture order ('spor') sample group description entry contains, per subpicture index/location, a 'susu' sample group description index of the substitute subpicture that can be used in the absence of a sample of the respective WC subpicture track. substitute_subpicture_idx is a 1-based index to 'susu' sample group description entries. substitute_subpicture_idx equal to 0 indicates that no substitute subpicture is indicated The following syntax may be used:

```
aligned(8) class VvcSubpicOrderEntry( ) extends
VisualSampleGroupEntry('spor')
{
    unsigned int(1) subpic_id_info_flag;
    unsigned int(1) substitute_subpic_flag;
    unsigned int(14) num_subpic_ref_idx;
    for (i = 0; i < num_subpic_ref_idx; i++)
        unsigned int(16) subp_track_ref_idx;
    for (i = 0; substitute_subpic_flag && i <
num_subpic_ref_idx; i++)
        unsigned int(16) substitute_subpicture_idx;
    if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_subpic_id_flag;
        if (pps_subpic_id_flag)
            unsigned int(6) pps_id;
        else {
            unsigned int(1) sps_subpic_id_flag;
            unsigned int(4) sps_id;
            bit(1) reserved = 0;
        }
    }
}
```

According to an embodiment, a list of 'subp' track reference indices is included in the 'susu' sample group description entry, wherein the 'subp' track reference indices indicate the subpicture tracks which the entry can substitute. The following syntax may be used:

```
aligned(8) class VvcSubstituteSubpictureEntry( ) extends
VisualSampleGroupEntry('susu')
{
    unsigned int(16) num_nalus_minus1;
    for (j = 0; j <= num_nalus_minus1; j++) {
        unsigned int(24) substitute_nalu_size;
        bit (8 * substitute_nalu_size) substitute_nal_unit;
    }
    unsigned int(16) num_subp_refs;
    for (j = 0; j < num_subp_refs; j++)
        unsigned int(32) subp_ref_idx[j];
}
```

According to an embodiment, no SampleToGroupBox is present for the 'susu' sample group in the example embodiment but the sample group description entries apply implicitly throughout the track. According to another embodiment, a 'susu' sample group description entry contains a list of substitute subpictures, and a conventional mapping of samples to entries is used.

There may be an indication specifying that the substitute subpicture can replace any 'subp' reference. E.g. num_subp_refs equal to 0 can be regarded as the indication in the example syntax.

If there are many 'susu' sample group description entries that map to the same 'subp' track reference, any of the entries can be used to substitute the 'subp' track reference.

Embodiments Based on Substitute Subpicture Item

According to an embodiment, a substitute subpicture is stored as a subpicture item.

In ISOBMFF, the ExtendedTypeBox may be placed after the FileTypeBox, any SegmentTypeBox, or any TrackTypeBox, or used as an item property to indicate that a reader should only process the file, the segment, the track, or the item, respectively, if it supports the processing requirements of all the brands in at least one of the contained TypecombinationBoxes, or at least one brand in the preceding FileTypeBox, SegmentTypeBox, or TrackTypeBox, or in the BrandProperty associated with the same item, respectively. The TypecombinationBox expresses that the associated file, segment, track, or item may contain any boxes or other code points required to be supported in any of the brands listed in the TypecombinationBox and that the associated file, segment, track, or item complies with the intersection of the constraints of the brands listed in the TypeCombinationBox.

In ISOBMFF, the brand 'unif' may be used to indicate unified handling of identifiers, for example across tracks, track groups, entity groups, and file-level MetaBoxes. The consequences comprise i) that a given identifier identifies at most one of those (or nothing at all); for example, there is no identifier which is used to label both a track and an entity group; and ii) that where an identifier is restricted, without this brand, to refer to a particular type (e.g. to a track by track_ID) that reference is no longer so restricted, and can refer to any type (e.g. to a track group), if the semantics of the reference permit it. When the 'unif' brand is in use at file level, the following identifiers have a unified value space: i) track_ID in the TrackHeaderBox in all tracks; ii) track_group_ID in the TrackGroupTypeBox of a TrackGroupBox in all tracks; iii) item_ID value in ItemInfoBox in a file-level MetaBox; and iv) group id in an EntityToGroupBox in the GroupsListBox in the file-level MetaBox. When the 'unif' brand is in use at movie or track level, the following identifiers have a unified value space: i) item_ID value in ItemInfoBox in the MetaBox at that level; and ii) group id in an EntityToGroupBox in the GroupsListBox in the MetaBox at that level. In files compliant with this brand, there are no two IDs with the same value in the same level. References used in boxes using reference by ID, such as TrackReferenceBox or ItemReferenceBox, only resolve within a given level. References do not cross levels. A reference to an identifier that is not present at the same level does not resolve According to an embodiment, when a substitute subpicture is the only option for a particular subpicture location, a 'subp' track reference is authored with a value that references the item ID of the subpicture image item. The 'unif' brand is included in the ExtendedTypeBox to indicate that a track reference to an item ID may be present.

According to an embodiment, a 'subp' track reference is authored with a value that references an entity group, such as an 'alte' entity group. The entity group is authored to contain the subpicture image item together with the subpicture tracks that it can substitute. The 'unif' brand is included in the ExtendedTypeBox to indicate that a track reference to an item ID may be present.

According to an embodiment, a sample-to-item sample group, as specified in ISOBMFF, is included in a subpicture track. An item_id[i] in a sample group description entry may equal to the item ID of the subpicture item to indicate that the subpicture item is a substitute subpicture for the respective sample in the subpicture track. There may be a single sample group description entry, which may be indicated to apply to all samples of the track.

According to an embodiment, a sample-to-item sample group, as specified in ISOBMFF, is included in a base track. It may be defined that item_id[i] values in a sample group description entry reference item ID values of subpicture items in the respective order as subp_track_ref_idx values in the 'spor' sample group description entry; i.e., a substitute subpicture with item ID equal to item_id[i] may be used to substitute the subpicture reference by the subp_track_ref_idx value with the same index i.

Other Embodiments

Depending on the option to carry substitute subpictures, the mapping information associates the first substitute subpicture with at least one of:
a track group of subpictures;
a first subpicture location in a subpicture layout;
at least a first subpicture reference that is resolvable to a first sequence of subpictures that may be substituted by the first substitute subpicture.

According to an embodiment, the metadata may additionally comprise properties of at least the first substitute subpicture. The properties may comprise, but are not limited to one or more of the following:
The VCL NAL unit type of the substitute subpicture;
Subpicture ID (e.g. sh_subpic_id in H.266VVC) of the substitute subpicture;
The width and height of the substitute subpicture, e.g. in luma samples;
The horizontal and vertical tile boundary positions within the substitute subpicture.

According to an embodiment, the metadata of the properties is used by a player. For example, the VCL NAL unit type of the substitute subpicture, when indicating a non-IRAP subpicture, may be used in determining that rewriting sh_subpic_id values(s) in the substitute subpicture is required.

According to an embodiment, a substitute subpicture track is included with a VVC base track into the same DASH Representation.

According to an embodiment, the metadata is indicated as a supplemental enhancement information (SEI) message, e.g. referred to as a substitute subpicture SEI message. In an embodiment, the substitute subpicture SEI message is inserted in a video bitstream that contains a sequence a substitute subpictures. In an embodiment, the substitute subpicture SEI message is included in a sample entry of a substitute subpicture track as a "declarative" SEI message to provide properties of the substitute subpicture track.

The method according to an embodiment is shown in FIG. 7. The method generally comprises indicating 710 video bitstream format wherein one or more image regions are allowed in a picture of a video bitstream; indicating 720 at least a first substitute image region; indicating 730 mapping information to locate the first substitute image region in the picture; wherein a first video bitstream comprising the first substitute image region at a location according to the mapping information conforms to the video bitstream format. Each of the steps can be implemented by a respective module of a computer system.

An apparatus according to an embodiment comprises means for indicating a video bitstream format wherein one or more image regions are allowed in a picture of a video bitstream; means for indicating at least a first substitute image region; means for indicating mapping information to locate the first substitute image region in the picture; wherein a first video bitstream comprising the first substitute image region at a location according to the mapping information conforms to the video bitstream format. The means comprises at least one processor, and a memory including a computer program code, wherein the processor may further comprise processor circuitry. The memory and the computer program code are configured to, with the at least one processor, cause the apparatus to perform the method of FIG. 7 according to various embodiments.

The method according to an embodiment is shown in FIG. 8. The method generally comprises decoding 810 a first indication of a video bitstream format wherein one or more image regions are allowed in a picture of a video bitstream; decoding 820 a second indication of at least a first substitute image region; decoding 830 mapping information to locate the first substitute image region in the picture; wherein a first video bitstream comprising the first substitute image region at a location according to the mapping information conforms to the video bitstream format; and in response to no other image regions are available for the location, including 840 the first substitute image region in the picture.

An apparatus according to an embodiment comprises means for decoding a first indication of a video bitstream format wherein one or more image regions are allowed in a picture of a video bitstream; means for decoding a second indication of at least a first substitute image region; means for decoding mapping information to locate the first substitute image region in the picture; wherein a first video bitstream comprising the first substitute image region at a location according to the mapping information conforms to the video bitstream format; and in response to no other image regions are available for the location, means for including the first substitute image region in the picture. The means comprises at least one processor, and a memory including a computer program code, wherein the processor may further comprise processor circuitry. The memory and the computer program code are configured to, with the at least one processor, cause the apparatus to perform the method of FIG. 8 according to various embodiments.

Figure 9:
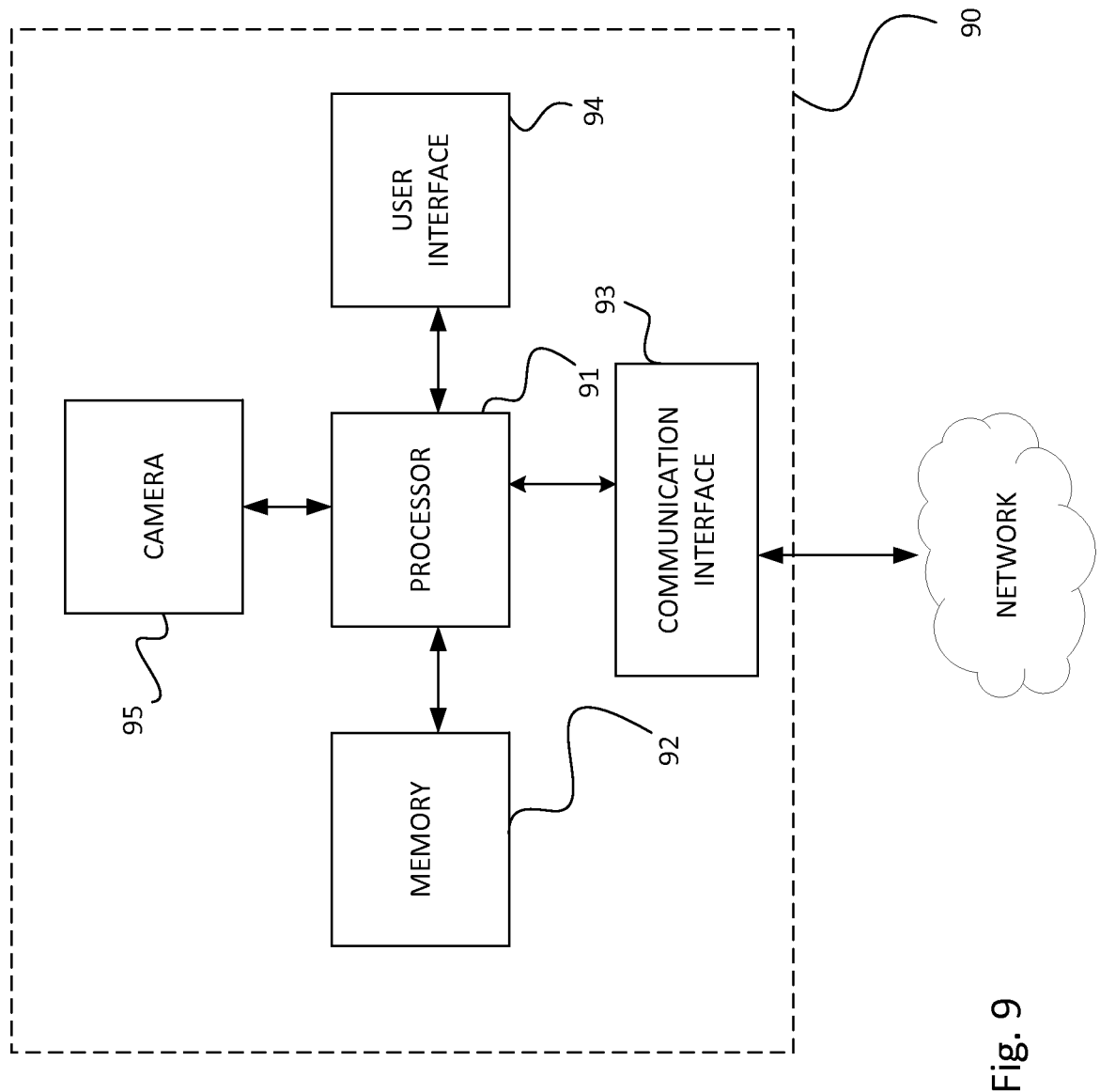
FIG. 9 shows an apparatus according to an embodiment.

An apparatus according to an embodiment is illustrated in FIG. 9. The apparatus is a user equipment for the purposes of the present embodiments. The apparatus 90 comprises a main processing unit 91, a memory 92, a user interface 94, a communication interface 93. The apparatus according to an embodiment, shown in FIG. 9, may also comprise a camera module 95. Alternatively, the apparatus may be configured to receive image and/or video data from an external camera device over a communication network. The memory 92 stores data including computer program code in the apparatus 90. The computer program code is configured to implement the method according various embodiments by means of various computer modules. The camera module 95 or the communication interface 93 receives data, in the form of images or video stream, to be processed by the processor 91. The communication interface 93 forwards processed data, i.e. the image file, for example to a display of another device, such as a virtual reality headset. When the apparatus 90 is a video source comprising the camera module 95, user inputs may be received from the user interface.

The various embodiments may provide advantages. For example, creating substitute subpictures requires capability for encoding both high-level syntax (slice header) and low-level syntax (slice data), which may be coded with an entropy coder, such as a context-based binary arithmetic coder (CABAC). Coding the slice header and slice data requires knowledge of the characteristics of the subpicture, such as the number of coding tree units. Having such subpicture encoding functionality in players is not desired due to the required processing and additional implementation effort, for example. Thus, it is advantageous to provide coded substitute subpicture as metadata to the players. While some embodiments have been described in relation to a player or alike, it needs to be understood that embodiments could likewise be used in other types of devices or software and mentioned benefits likewise apply to them. For example, embodiments may be applied in a network element, which may merge incoming subpicture tracks or alike into a video bitstream containing multiple subpictures. For example, when any of the incoming subpicture tracks is delayed, a substitute subpicture may be used as described in some embodiments in the video bitstream containing multiple subpictures.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
    indicating a video bitstream format, wherein one or more image regions are allowed in a picture of a video bitstream;
    indicating at least a first substitute image region; and
    indicating mapping information to locate the first substitute image region in the picture;
    wherein a first video bitstream, comprising the first substitute image region at a location according to the mapping information, conforms to the video bitstream format; and
    the indicating of at least the first substitute image region implies that the first substitute image region is not intended for displaying.

2. The method according to claim 1, wherein the indication of the at least first substitute image region comprises at least one of:
    the new element or attribute in the media description, the media description comprising Dynamic adaptive streaming over HTTP Media Presentation Description (DASH MPD);
    the new bit in the flags field in the header of the alternative ('alte') box, the new bit in the flags field in the header of the alternative ('alte') box being 1 indicating a substitute subpicture or alike; or
    the new bit in the flags field of the header of the specific box, the new bit in the flags field of the header of the specific box being 0 indicating presentable data, and the new bit in the flags field of the header of the specific box being 1 indicating non-presentable data and consequently being used for substitute subpicture tracks.

3. An apparatus comprising at least one processor, and a memory including computer program code, the memory and the computer program code configured to, with the at least one processor, cause the apparatus to perform at least the following:
    indicate a video bitstream format wherein one or more image regions are allowed in a picture of a video bitstream;
    indicate at least a first substitute image region; and
    indicate mapping information to locate the first substitute image region in the picture; and
    wherein a first video bitstream comprising the first substitute image region at a location according to the mapping information conforms to the video bitstream format; and
    the indicating of at least the first substitute image region implies that the first substitute image region is not intended for displaying.

4. The apparatus according to claim 3, wherein at least the first substitute image region is present in a sample of a subpicture track and an indication of the at least first substitute image region comprises one or more of the following:
    a specific box in a sample entry of the subpicture track;
    a dedicated box header flag of a configuration box comprised in the sample entry of the subpicture track;
    a specific field in the configuration box comprised in the sample entry of the subpicture track;
    a new part of codecs Multipurpose Internet Mail Extensions (MIME) parameter for the sample entry of the subpicture track;
    a new optional MIME parameter;
    a new element or attribute in a media description;
    a new track group type;
    a new bit in a flags field in a header of an alternative (alte) box;
    a new field extending the alternative (alte) box;
    a first new track reference type from substitute track to the subpicture track;
    a second new track reference type to substitute track from the subpicture track; or a new bit in a flags field of a header of the specific box is used in indicating if the subpicture track contains presentable data.

5. The apparatus according to claim 3, wherein the mapping information associates the first substitute image region with at least one of the following: a track group of image region tracks; a first image region location in an image region layout; or at least a first image region reference that is resolvable to a first sequence of image regions that is be substituted by the first substitute image region.

6. The apparatus according to claim 3, wherein the indicating of at least the first substitute image region comprises;
write one or more indications into one or more containers, wherein the one or more containers are any combination of following: metadata in a file that encapsulates coded video data for the first video bitstream; a media description for the first video bitstream; or a syntax structure in or along the first video bitstream.

7. The apparatus according to claim 3, wherein the indication of the at least first substitute image region comprises at least one of:
the new element or attribute in the media description, the media description comprising Dynamic adaptive streaming over HTTP Media Presentation Description (DASH MPD);
the new bit in the flags field in the header of the alternative ('alte') box, the new bit in the flags field in the header of the alternative ('alte') box being 1 indicating a substitute subpicture or alike; or
the new bit in the flags field of the header of the specific box, the new bit in the flags field of the header of the specific box being 0 indicating presentable data, and the new bit in the flags field of the header of the specific box being 1 indicating non-presentable data and consequently being used for substitute subpicture tracks.

8. A method, comprising:
decoding a first indication of a video bitstream format, wherein one or more image regions are allowed in a picture of a video bitstream;
decoding a second indication of at least a first substitute image region; and
decoding mapping information to locate the first substitute image region in the picture;
wherein a first video bitstream comprising the first substitute image region at a location according to the mapping information conforms to the video bitstream format;
the second indication of at least the first substitute Image region implies that the first substitute image region is not intended for displaying; and
the method further comprises: in response to no other image regions being available for the location, including the first substitute image region in the picture.

9. The method according to claim 8, wherein at least the first substitute image region is present in a sample of a subpicture track and the second indication comprises one or more of the following:
a specific box in a sample entry of the subpicture track;
a dedicated box header flag of a configuration box contained in the sample entry of the subpicture track;
a specific field in the configuration box contained in the sample entry of the subpicture track;
a new part of codecs Multipurpose Internet Mail Extensions (MIME) parameter for the sample entry of the subpicture track;
a new optional MIME parameter;
a new element or attribute in a media description;
a new track group type;
a new bit in a flags field in a header of an alternative ('alte') box;
a new field extending the alternative ('alte') box;
a new track reference type from/to substitute track to/from subpicture track; or
a new bit in a flags field of a header of the specific box is used in indicating if the subpicture track contains presentable data.

10. The method according to claim 8, wherein the mapping information associates the first substitute image region with at least one of the following: a track group of image region tracks; a first image region location in an image region layout; or at least a first image region reference that is resolvable to a first sequence of image regions that is be substituted by the first substitute image region.

11. The method according to claim 8, wherein the decoding of the first indication comprises;
writing one or more indications into one or more containers, wherein the one or more containers are any combination of following: metadata in a file that encapsulates coded video data for the first video bitstream; a media description for the first video bitstream; or a syntax structure in or along the first video bitstream.

12. The method according to claim 8, further comprising determining whether the first substitute image region is included multiple times in the picture and in such a case, rewriting an identifier value of such substitute image regions with a same identifier value.

13. The method according to claim 9, wherein the second indication comprises at least one of:
the new element or attribute in the media description, the media description comprising Dynamic adaptive streaming over HTTP Media Presentation Description (DASH MPD);
the new bit in the flags field in the header of the alternative ('alte') box, the new bit in the flags field in the header of the alternative ('alte') box being 1 indicating a substitute subpicture or alike; or
the new bit in the flags field of the header of the specific box, the new bit in the flags field of the header of the specific box being 0 indicating presentable data, and the new bit in the flags field of the header of the specific box being 1 indicating non-presentable data and consequently being used for substitute subpicture tracks.

14. An apparatus, comprising at least one processor, and a memory including computer program code, the memory and the computer program code configured to, with the at least one processor, cause the apparatus to perform at least the following:
decode a first indication of a video bitstream format wherein one or more image regions are allowed in a picture of a video bitstream;
decode a second indication of at least a first substitute image region; and
decode mapping information to locate the first substitute image region in the picture;
wherein a first video bitstream comprising the first substitute image region at a location according to the mapping information conforms to the video bitstream format;
the second indication of at least the first substitute image region implies that the first substitute image region is not intended for displaying; and the memory and the computer program code are also configured to, with the at least one processor, cause the apparatus to perform: in response to no other image regions being available for the location, include the first substitute image region in the picture.

15. The apparatus according to claim 14, wherein at least the first substitute image region is present in a sample of a subpicture track and the second indication comprises one or more of the following:
   a specific box in a sample entry of the subpicture track;
   a dedicated box header flag of a configuration box contained in the sample entry of the subpicture track;
   a specific field in the configuration box contained in the sample entry of the subpicture track;
   a new part of codecs Multipurpose Internet Mail Extensions (MIME) parameter for the sample entry of the subpicture track;
   a new optional MIME parameter;
   a new element or attribute in a media description;
   a new track group type;
   a new bit in a flags field in a header of an alternative ('alte') box;
   a new field extending the alternative ('alte') box;
   a first new track reference type from substitute track to the subpicture track;
   a second new track reference type to substitute track from the subpicture track; or
   a new bit in a flags field of a header of the specific box is used in indicating if the subpicture track contains presentable data.

16. The apparatus according to claim 14, wherein the mapping information associates the first substitute image region with at least one of the following: a track group of image region tracks; a first image region location in an image region layout; at least a first image region reference that is resolvable to a first sequence of image regions that may be substituted by the first substitute image region.

17. The apparatus according to claim 14, wherein the decoding of the first indication comprises:
   writing one or more indications into one or more containers, wherein the one or more containers are any combination of following: metadata in a file that encapsulates coded video data for the first video bitstream; a media description for the first video bitstream; or a syntax structure in or along the first video bitstream.

18. The apparatus according to claim 14, wherein the apparatus is further caused to determine whether the first substitute image region is included multiple times in the picture and in such a case, rewriting an identifier value of such substitute image regions with a same identifier value.

19. The apparatus according to claim 15, wherein the second indication comprises at least one of:
   the new element or attribute in the media description, the media description comprising Dynamic adaptive streaming over HTTP Media Presentation Description (DASH MPD);
   the new bit in the flags field in the header of the alternative ('alte') box, the new bit in the flags field in the header of the alternative ('alte') box being 1 indicating a substitute subpicture or alike; or
   the new bit in the flags field of the header of the specific box, the new bit in the flags field of the header of the specific box being 0 indicating presentable data, and the new bit in the flags field of the header of the specific box being 1 indicating non-presentable data and consequently being used for substitute subpicture tracks.

* * * * *